United States Patent
Yuasa et al.

(10) Patent No.: US 10,263,227 B2
(45) Date of Patent: Apr. 16, 2019

(54) ENERGY STORAGE APPARATUS AND METHOD FOR MANUFACTURING THE SAME

(71) Applicants: GS Yuasa International Ltd., Kyoto-shi (JP); Honda Motor Co., Ltd., Tokyo (JP)

(72) Inventors: Eiji Yuasa, Kyoto (JP); Kentaro Shibuya, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 15/435,153

(22) Filed: Feb. 16, 2017

(65) Prior Publication Data

US 2017/0244075 A1    Aug. 24, 2017

(30) Foreign Application Priority Data

Feb. 19, 2016 (JP) .................. 2016-030250

(51) Int. Cl.
*H01M 2/10* (2006.01)
*H01M 2/12* (2006.01)
*H01G 11/10* (2013.01)

(52) U.S. Cl.
CPC .......... *H01M 2/1016* (2013.01); *H01G 11/10* (2013.01)

(58) Field of Classification Search
CPC ............ H01M 2/02; H01M 2/12; H01M 2/10; H01M 2/04
See application file for complete search history.

(56) References Cited

U.S. PATENT DOCUMENTS

| | | | |
|---|---|---|---|
| 2005/0058891 A1* | 3/2005 | Marraffa | H01M 2/1077 429/99 |
| 2011/0151309 A1 | 6/2011 | Park et al. | |
| 2013/0330587 A1 | 12/2013 | Takahashi et al. | |
| 2015/0132634 A1 | 5/2015 | Sera et al. | |
| 2016/0126514 A1 | 5/2016 | Suzuki et al. | |

FOREIGN PATENT DOCUMENTS

| | | |
|---|---|---|
| JP | 2010-086887 A | 4/2010 |
| JP | 2011-129509 A | 6/2011 |
| JP | 2014-044884 A | 3/2014 |
| JP | 2015-099649 A | 5/2015 |
| WO | WO 2012/066875 A1 | 5/2012 |
| WO | WO 2013/179796 A1 | 12/2013 |
| WO | WO 2014/203342 A1 | 12/2014 |

* cited by examiner

*Primary Examiner* — Kenneth J Douyette
(74) *Attorney, Agent, or Firm* — McGinn IP Law Group, PLLC.

(57) ABSTRACT

Provided is an energy storage apparatus which includes: an energy storage device; an opposedly facing member which opposedly faces the energy storage device in a first direction; and an adjacent member which is disposed adjacently to the energy storage device in a second direction orthogonal to the first direction. The opposedly facing member and the adjacent member are engaged with each other such that the adjacent member and the opposedly facing member are relatively movable to each other.

8 Claims, 21 Drawing Sheets

FIG. 17
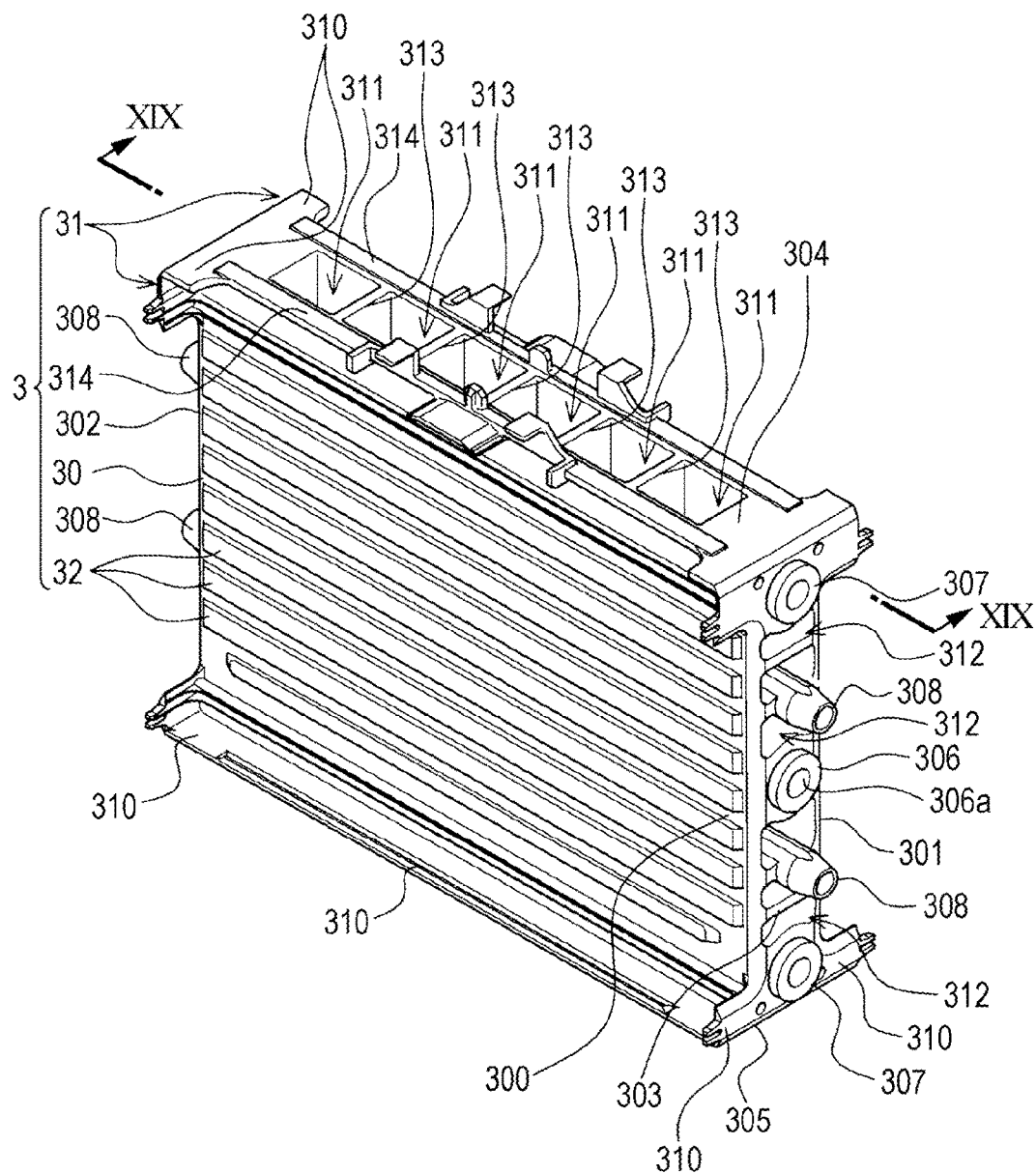
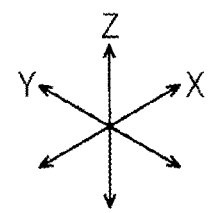

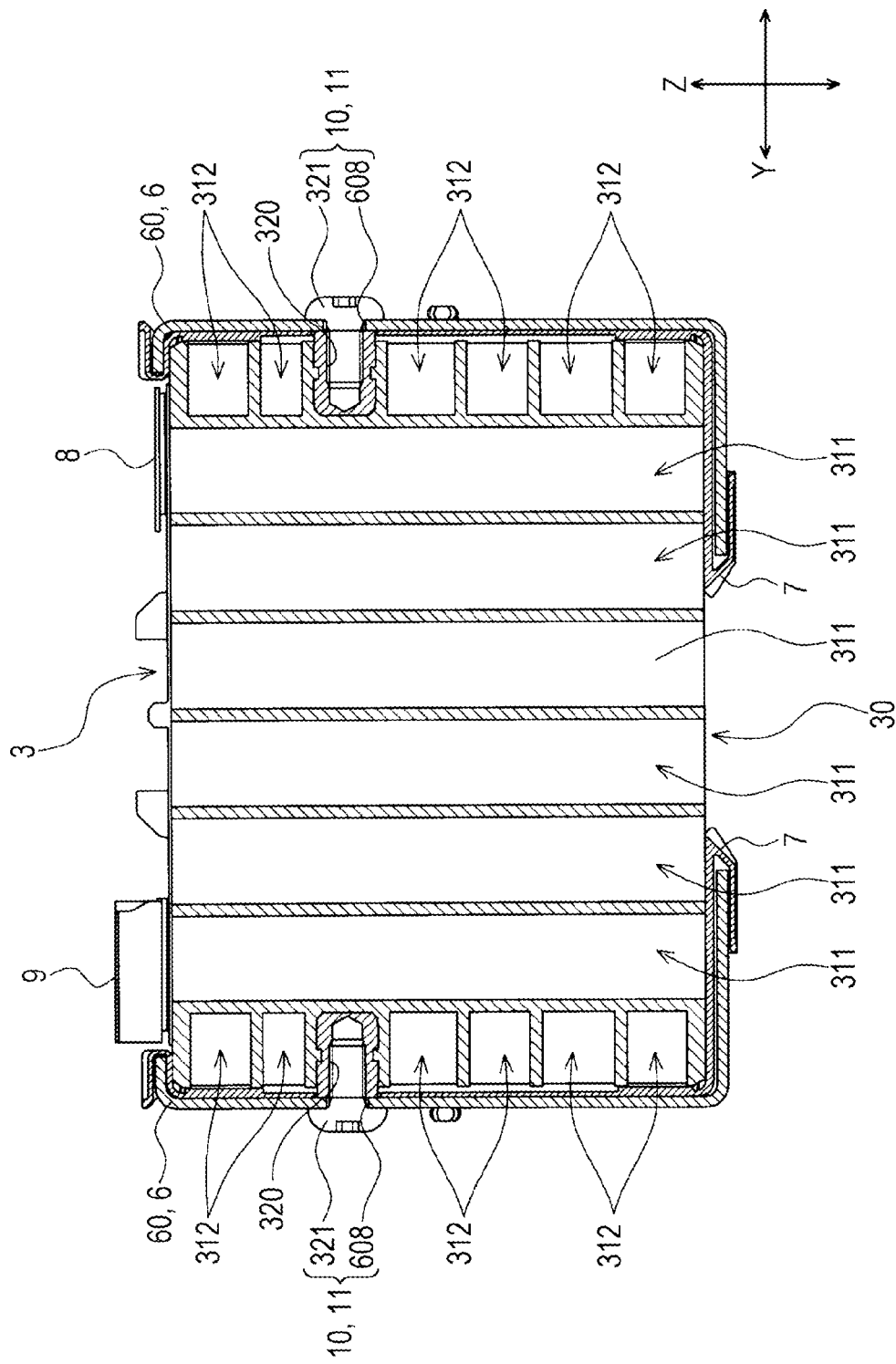

ENERGY STORAGE APPARATUS AND METHOD FOR MANUFACTURING THE SAME

CROSS-REFERENCE TO RELATED APPLICATIONS

This application claims the benefit of Japanese patent application No. 2016-030250 filed on Feb. 19, 2016 which is incorporated by reference.

FIELD

The present invention relates to an energy storage apparatus which includes energy storage devices and adjacent members which position the energy storage devices, and a method of manufacturing the energy storage apparatus.

BACKGROUND

Conventionally, as a battery system which includes a plurality of flat secondary batteries, there has been provided a battery system which is manufactured by taking into account vibration resistance and impact resistance (see JP 2014-44884 A, for example). Such a battery system includes: a battery assembly formed by stacking a plurality of flat secondary batteries in a thickness direction; a pair of end plates disposed on both end surfaces of the battery assembly in a stacking direction; bind bars connected to the pair of end plates and fixing the flat secondary batteries in the stacking direction by applying pressure to the flat secondary batteries; and an intermediate reinforcing plate disposed between the flat secondary batteries which form the battery assembly and fixed to the bind bars.

In such a battery system, the end plates and the intermediate reinforcing plate fix the stacked flat secondary batteries in a pressurized state. That is, in the battery system, the battery assembly (flat secondary batteries) is fixed in a state where the battery assembly is positioned with reference to the intermediate reinforcing plate.

In the above-mentioned battery system, the intermediate reinforcing plate is fixed to the bind bars and hence, the battery assembly (flat secondary batteries) is positioned in accordance with the posture of the intermediate reinforcing plate. Accordingly, when the arrangement or the posture of the intermediate reinforcing plate is inappropriate, the battery assembly (flat secondary batteries) is also positioned and fixed in an inappropriate state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which can position energy storage devices in an appropriate state, and a method of manufacturing the energy storage apparatus.

An energy storage apparatus according to an aspect of the present invention includes:

an energy storage device;

an opposedly facing member which opposedly faces the energy storage device in a first direction;

an adjacent member which opposedly faces the opposedly facing member in the first direction and is disposed adjacently to the energy storage device in a second direction orthogonal to the first direction; and an engaging portion where the adjacent member and the opposedly facing member are engaged with each other in a relatively movable manner.

BRIEF DESCRIPTION OF DRAWINGS

The foregoing and other features of the present invention will become apparent from the following description and drawings of an illustrative embodiment of the invention in which:

FIG. 17 is an entire perspective view of a first adjacent member used in an energy storage apparatus according to another embodiment as viewed from a first surface side.

FIG. 21 is a cross-sectional view of an energy storage apparatus according to still another embodiment.

DESCRIPTION OF EMBODIMENTS

Figure 1:
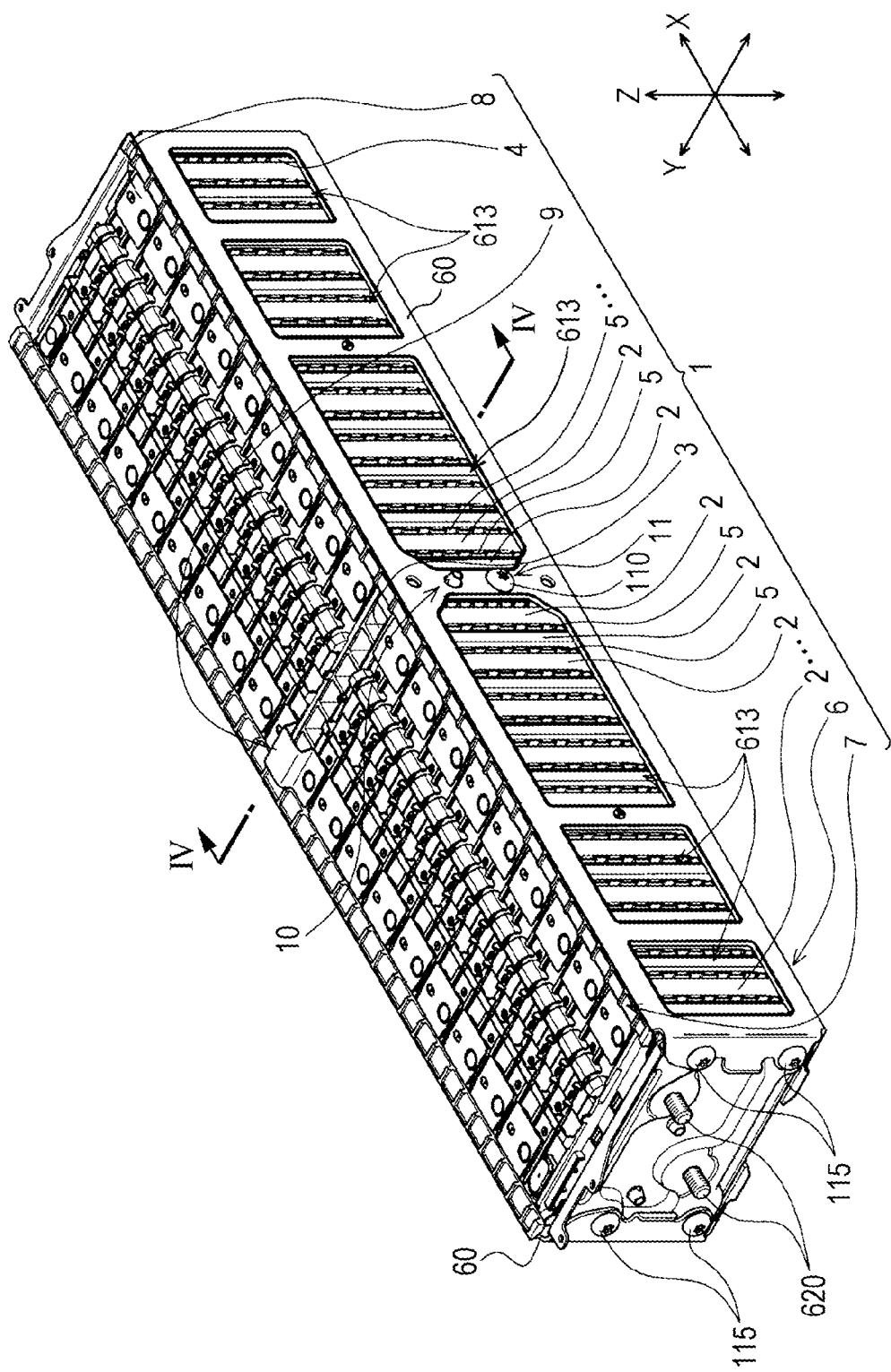
FIG. 1 is an entire perspective view of an energy storage apparatus according to an embodiment.

According to an aspect of the present invention, there is provided an energy storage apparatus which includes:

an energy storage device;

an opposedly facing member which opposedly faces the energy storage device in a first direction;

an adjacent member which opposedly faces the opposedly facing member in the first direction and is disposed adjacently to the energy storage device in a second direction orthogonal to the first direction; and an engaging portion where the adjacent member and the opposedly facing member are engaged with each other in a relatively movable manner.

With such a configuration, the energy storage apparatus includes the engaging portion where the adjacent member and the opposedly facing member are engaged with each other in a relatively movable manner and hence, by allowing the relative movement between the adjacent member and the opposedly facing member, the adjacent member can be brought into an appropriate state. Accordingly, the energy storage device is disposed adjacently to the adjacent member so that the energy storage device can be appropriately positioned.

The engaging portion may include:

a hole which is formed in one of either the opposedly facing member or the adjacent member, the hole having a center axis thereof extending in the first direction; and a shaft portion which is formed on the other of either the opposedly facing member or the adjacent member, the shaft portion being inserted into the hole in a state where a gap is formed between an outer peripheral surface of the shaft portion per se and an inner peripheral surface which defines the hole.

With such a configuration, in the engaging portion, the shaft portion is rotatable using the axis of the shaft portion per se as the center of rotation, and is movable within the hole. Accordingly, the adjacent member is rotatable about the shaft portion, and is movable corresponding to a movable range of the shaft portion within the hole (the distance between the outer peripheral surface of the shaft portion and the inner peripheral surface which defines the hole). Accordingly, the adjacent member can be adjusted so as to assume the appropriate arrangement or the appropriate posture.

In the above-mentioned configuration, the energy storage device may have external terminals on an end portion thereof in a third direction orthogonal to the first direction and the second direction, and the shaft portion may be inserted into the hole in a state where a gap is formed in the third direction between the outer peripheral surface of the shaft portion per se and the inner peripheral surface which defines the hole. With such a configuration, a movable range of the shaft portion in the third direction is increased and hence, an adjustment allowable amount of the arrangement of the adjacent member is increased. Further, the adjacent member is moved in the third direction and hence, the arrangement of the energy storage device disposed adjacently to the adjacent member is adjusted. Accordingly, the external terminals of the energy storage device can be set at appropriate positions or an appropriate height.

In the above-mentioned configuration, the energy storage apparatus may include a fixing portion which fixes the adjacent member to the opposedly facing member, and the fixing portion may make the opposedly facing member and the adjacent member relatively non-movable to each other.

With such a configuration, in a state where the adjacent member is brought into an appropriate state by allowing the relative movement between the opposedly facing member and the adjacent member, the fixing portion brings the opposedly facing member and the adjacent member into a relatively non-movable state and hence, the adjacent member is maintained in an appropriate state while holding the positional relationship with respect to the opposedly facing member. Accordingly, the energy storage device disposed adjacently to the adjacent member is also brought into an appropriate state.

The fixing portion may include a shaft-like member which extends in the first direction and extends over the opposedly facing member and the adjacent member, and the shaft-like member may be insertable or retractable with respect to at least the adjacent member.

With such a configuration, the shaft-like member which extends in the first direction and extends over the opposedly facing member and the adjacent member interferes with both the opposedly facing member and the adjacent member and hence, the rotation and the movement of the adjacent member are prevented. On the other hand, when the shaft-like member is removed from at least the adjacent member, the interference of the shaft-like member with respect to the adjacent member is cancelled and hence, the rotation and the movement of the adjacent member are allowed whereby the posture and the arrangement of the adjacent member can be adjusted.

According to another aspect of the present invention, there is provided an energy storage apparatus which includes:

an energy storage device;

an opposedly facing member which opposedly faces the energy storage device in a first direction;

an adjacent member which opposedly faces the opposedly facing member in the first direction and is disposed adjacently to the energy storage device in a second direction orthogonal to the first direction;

an engaging portion where the adjacent member and the opposedly facing member are engaged with each other in a relatively movable manner; and a fixing portion which fixes the adjacent member to the opposedly facing member, wherein the engaging portion includes:

a hole which is formed in one of either the opposedly facing member or the adjacent member, the hole having a center axis thereof extending in the first direction; and a shaft portion which is formed on the other of either the opposedly facing member or the adjacent member, the shaft portion being inserted into the hole in a state where a gap is formed between an outer peripheral surface of the shaft portion per se and an inner peripheral surface which defines the hole, the fixing portion includes: a male threaded portion which is made to pass through the opposedly facing member; and a female threaded portion which is combined with the male threaded portion, and the adjacent member includes either one of the male threaded portion or the female threaded portion.

With such a configuration, in the engaging portion, the shaft portion is rotatable using the axis of the shaft portion per se as the center of rotation, and is movable within the hole. Accordingly, the adjacent member is rotatable about the shaft portion, and is movable corresponding to a movable range of the shaft portion within the hole (the distance between the outer peripheral surface of the shaft portion and the inner peripheral surface which defines the hole). Accordingly, the adjacent member can be adjusted so as to assume the appropriate arrangement or the appropriate posture.

Further, the fixing portion fixes the adjacent member to the opposedly facing member and hence, the adjacent member is maintained in an appropriate state while holding the positional relationship with respect to the opposedly facing member. Accordingly, the energy storage device disposed adjacently to the adjacent member is also brought into an appropriate state. Particularly, the fixing portion includes the male threaded portion which is made to pass through the opposedly facing member and the female threaded portion which is combined with the male threaded portion, and the adjacent member includes either one of the male threaded portion or the female threaded portion. Accordingly, it is possible to perform the positional adjustment between the adjacent member and the energy storage device disposed adjacently to the adjacent member by loosening the male threaded portion and female threaded portion which are combined with each other, while the adjacent member brought into an appropriate state is firmly fixed to the opposedly facing member by fastening the male threaded portion and female threaded portion which are combined with each other.

According to still another aspect of the present invention, there is provided a method of manufacturing an energy storage apparatus which includes the steps of: providing an energy storage device which is disposed adjacently to an adjacent member in a second direction orthogonal to a first direction out of an opposedly facing member and the adjacent member which opposedly face each other in the first direction and are engaged with each other in a relatively movable manner; and changing a relative position between the energy storage device and the opposedly facing member.

With such a method, when the relative position between the energy storage device and the opposedly facing member is changed, the relative position between the adjacent member disposed adjacently to the energy storage device and the opposedly facing member is also changed. Accordingly, when the adjacent member is brought into an appropriate state (arrangement or posture), the energy storage device disposed adjacently to the adjacent member is positioned appropriately.

The method may further include the step of making the opposedly facing member and the adjacent member relatively non-movable to each other after the relative position between the energy storage device and the opposedly facing member is changed. With such a method, it is possible to prevent the occurrence of a change in state of the adjacent member and the energy storage device which are brought into an appropriate state and hence, the adjacent member and the energy storage device can be maintained in an appropriate state.

The energy storage device may have external terminals on an end portion thereof in a third direction orthogonal to the first direction and the second direction, and a change in the relative position between the energy storage device and the opposedly facing member may include the change in relative position between the energy storage device and the opposedly facing member in a third direction. With such a method, the external terminals of the energy storage device can be disposed at an appropriate position or an appropriate height.

As described above, according to the present invention, the energy storage device can be positioned in an appropriate state.

Hereinafter, one embodiment of an energy storage apparatus according to the present invention is described with reference to drawings. Names of respective constitutional members (respective constitutional elements) used in this embodiment are exclusively for this embodiment, and may differ from names of respective constitutional members (respective constitutional elements) used in BACKGROUND.

Figure 2:
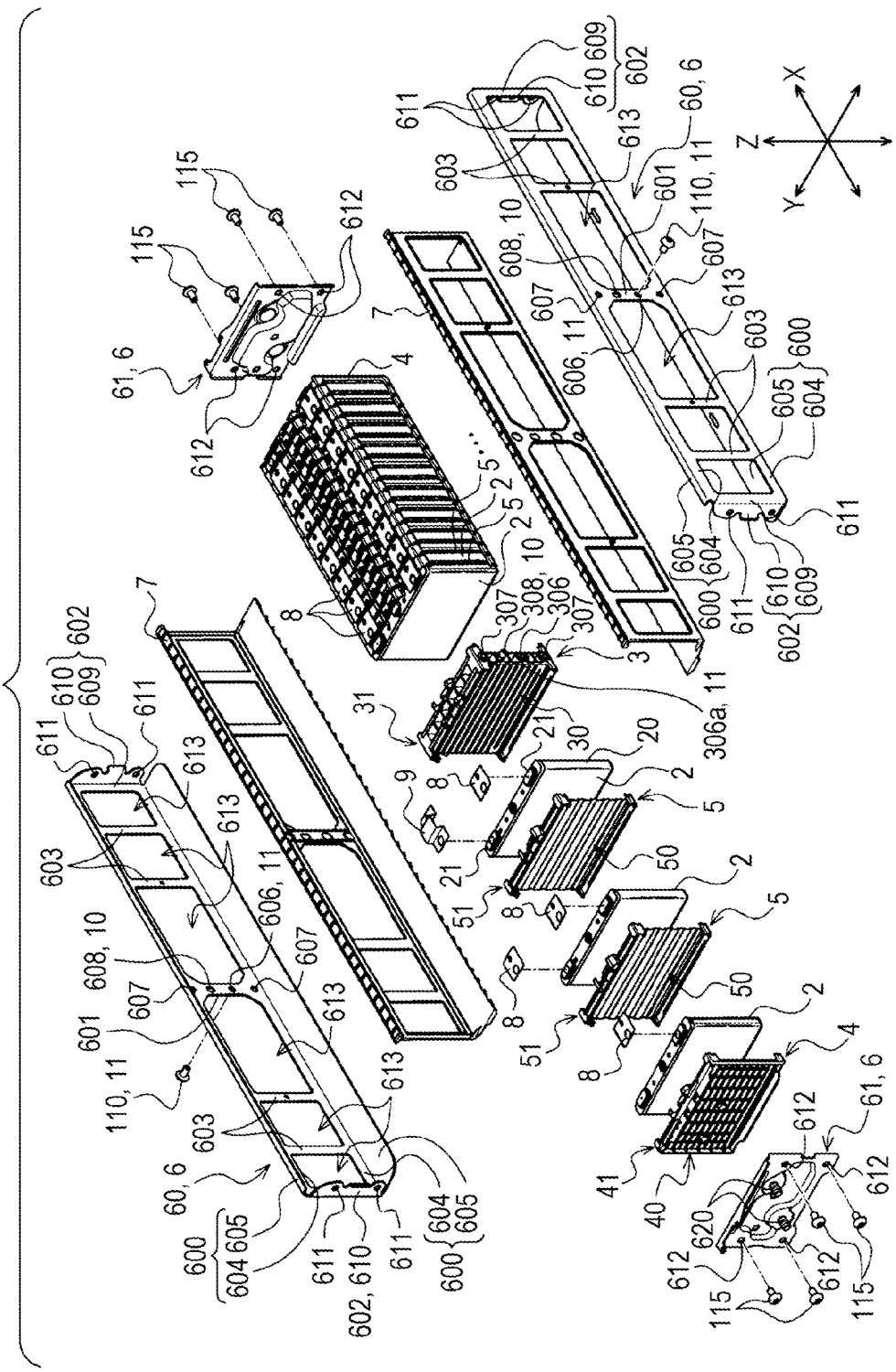
FIG. 2 is an exploded perspective view of the energy storage apparatus.

As shown in FIG. 1 and FIG. 2, the energy storage apparatus includes: energy storage devices 2; adjacent members 3, 4, 5 disposed adjacently to the energy storage devices 2; and a holder 6 which includes opposedly facing members 60 which opposedly face the energy storage devices 2 in the direction orthogonal to the direction along which the adjacent members 3, 4, 5 are disposed adjacently to the energy storage devices 2 and collectively holds the energy storage devices 2 and the adjacent members 3, 4, 5. The holder 6 is made of a conductive material. Accordingly, the energy storage apparatus 1 according to this embodiment includes insulators 7 which are disposed between the energy storage devices 2 and the holder 6.

The energy storage apparatus 1 includes a plurality of energy storage devices 2. Accordingly, the energy storage apparatus 1 includes bus bars 8, 9 which electrically connect the energy storage devices 2 to each other.

In the description made hereinafter, for the sake of convenience, the direction along which the energy storage devices 2 and the adjacent members 3, 4, 5 are arranged in a row is assumed as the X axis direction. One of two axial directions orthogonal to the X axis direction is assumed as the Y axis direction, and the other of two axial directions orthogonal to the X axis direction (the direction orthogonal to the X axis direction and the Y axis direction) is assumed as the Z axis direction. Accordingly, in the respective drawings, orthogonal coordinate axes which respectively correspond to the X axis direction, the Y axis direction and the Z axis direction are illustrated.

Figure 3:
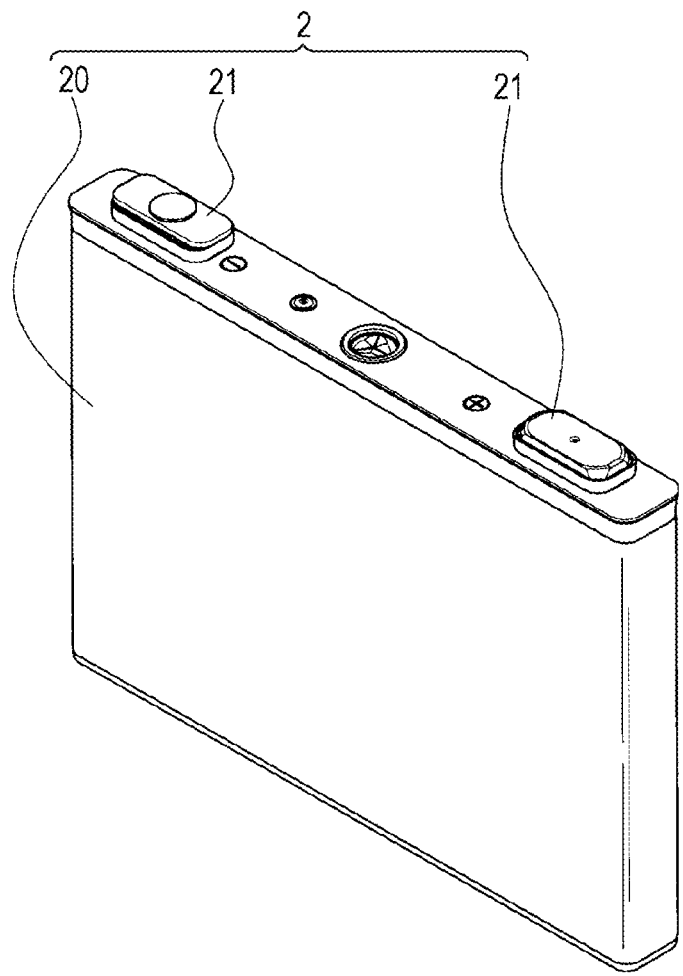
FIG. 3 is an entire perspective view of an energy storage device used in the energy storage apparatus.

As shown in FIG. 2 and FIG. 3, the energy storage device 2 includes: a case 20 in which an electrode assembly having a positive electrode and a negative electrode is housed; and a pair of external terminals 21 disposed on an outer surface of the case 20.

The case 20 is formed into a rectangular parallelepiped shape. An outer size of the case 20 in the X axis direction is smaller than an outer size of the case 20 in the Y axis direction. That is, the case 20 has a flat rectangular parallelepiped shape.

The pair of external terminals 21 is disposed on one of both end surfaces of the case 20 in the Z axis direction. The pair of external terminals 21 is disposed in a spaced-apart manner in the Y axis direction. One of the pair of external terminals 21 is electrically connected to the positive electrode of the electrode assembly housed in the case 20. On the other hand, the other of the pair of external terminals 21 is electrically connected to the negative electrode of the electrode assembly housed in the case 20.

The adjacent members 3, 4, 5 have insulating property. As shown in FIG. 2, each adjacent member 3, 4, 5 includes a body portion 30, 40, 50 disposed adjacently to the cases 20 of the energy storage devices 2, and restricting portions 31, 41, 51 which prevent positional displacement of the energy storage devices 2 disposed adjacently to the body portion 30, 40, 50.

The adjacent members 3, 4, 5 are described more specifically. As described above, the energy storage apparatus 1 includes the plurality of energy storage devices 2. Along with such a configuration, the energy storage apparatus 1 includes three kinds of adjacent members 3, 4, 5. That is, as the adjacent members, the energy storage apparatus 1 includes: the first adjacent member 3 disposed adjacently to the energy storage devices 2 disposed at an intermediate position in the X axis direction; the second adjacent members 4 each of which is disposed adjacently to the energy storage device 2 disposed at an outermost end of a unit formed of the plurality of energy storage devices 2; and the third adjacent members 5 which are disposed adjacently to the energy storage devices 2 disposed between the first adjacent member 3 and the second adjacent member 4.

As shown in FIG. 1, the energy storage apparatus 1 according to this embodiment includes engaging portions 10 each of which makes the first adjacent member 3 and the oppositely facing member 60 engaged with each other in a relatively movable manner. The energy storage apparatus 1 also includes fixing portions 11 each of which fixes the first adjacent member 3 to the oppositely facing member 60.

Figure 4:
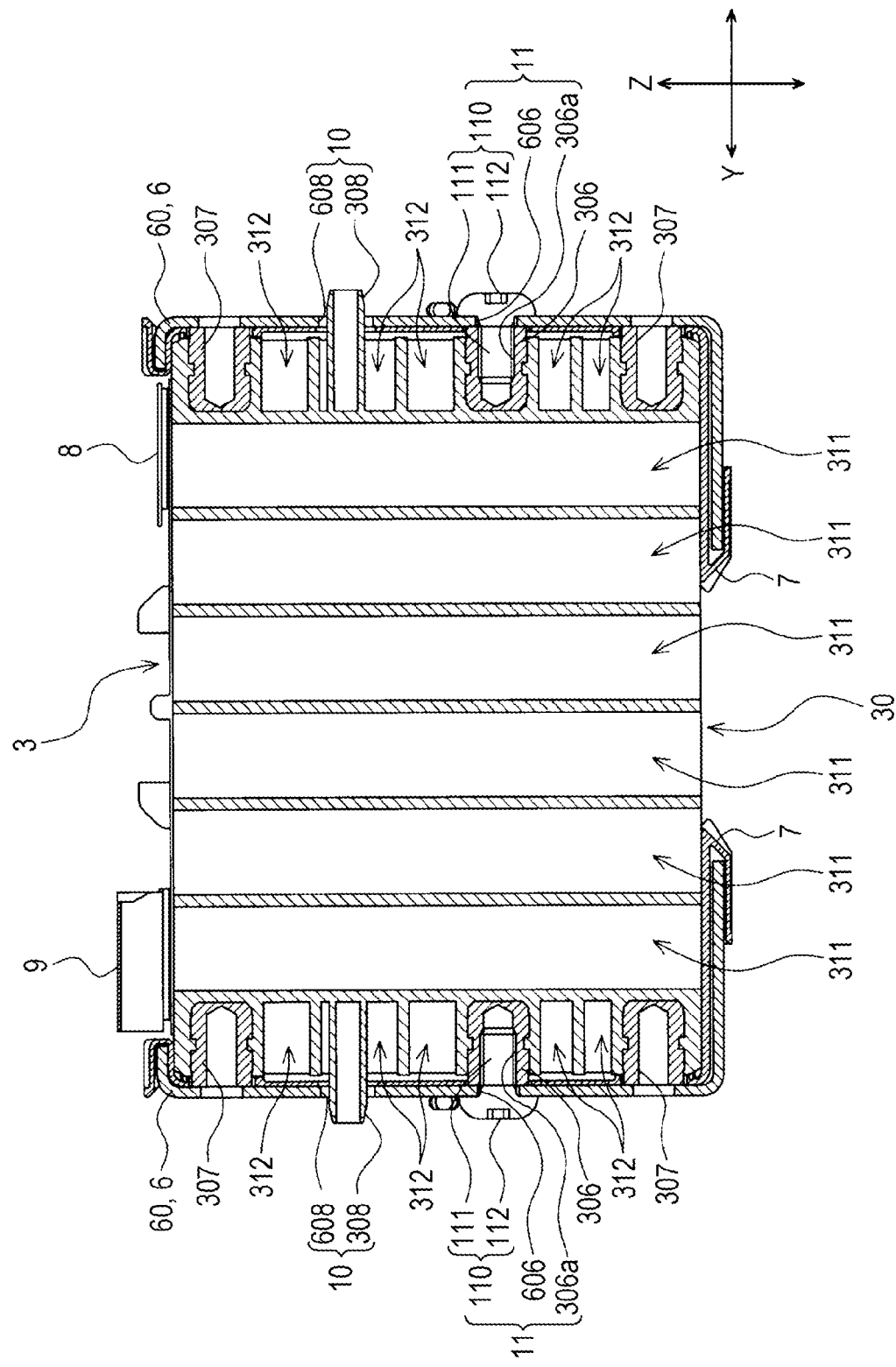
FIG. 4 is a cross-sectional view taken along a line IV-IV in FIG. 1.

The engaging portions 10 and the fixing portions 11 are schematically described hereinafter. As shown in FIG. 4, each engaging portion 10 is formed of a hole 608 formed in either one of the oppositely facing member 60 or the first adjacent member 3 (the oppositely facing member 60 in this embodiment) and having a center axis thereof extending in the Y axis direction; and a shaft portion 308 formed on the other of the oppositely facing member 60 or the first adjacent member 3 (the first adjacent member 3 in this embodiment) and inserted into the hole 608 which is a counterpart of the shaft portion 308.

The fixing portion 11 includes a shaft-like member 110 which extends in the Y axis direction, extends over the oppositely facing member 60 and the first adjacent member 3, and is insertable or retractable with respect to at least the first adjacent member 3. That is, the fixing portion 11 includes: a hole 306a formed in the oppositely facing member 60; a hole 606 formed in the first adjacent member 3; and the shaft-like member 110 which is inserted into the holes 306a, 606. In this embodiment, the shaft-like member 110 is a male threaded member which includes: a shaft-like male threaded portion 111; and a head portion 112 having a larger diameter than the male threaded portion 111. The male threaded portion 111 penetrates the oppositely facing member 60 and is threadedly engaged with the first adjacent member 3.

Figure 5:
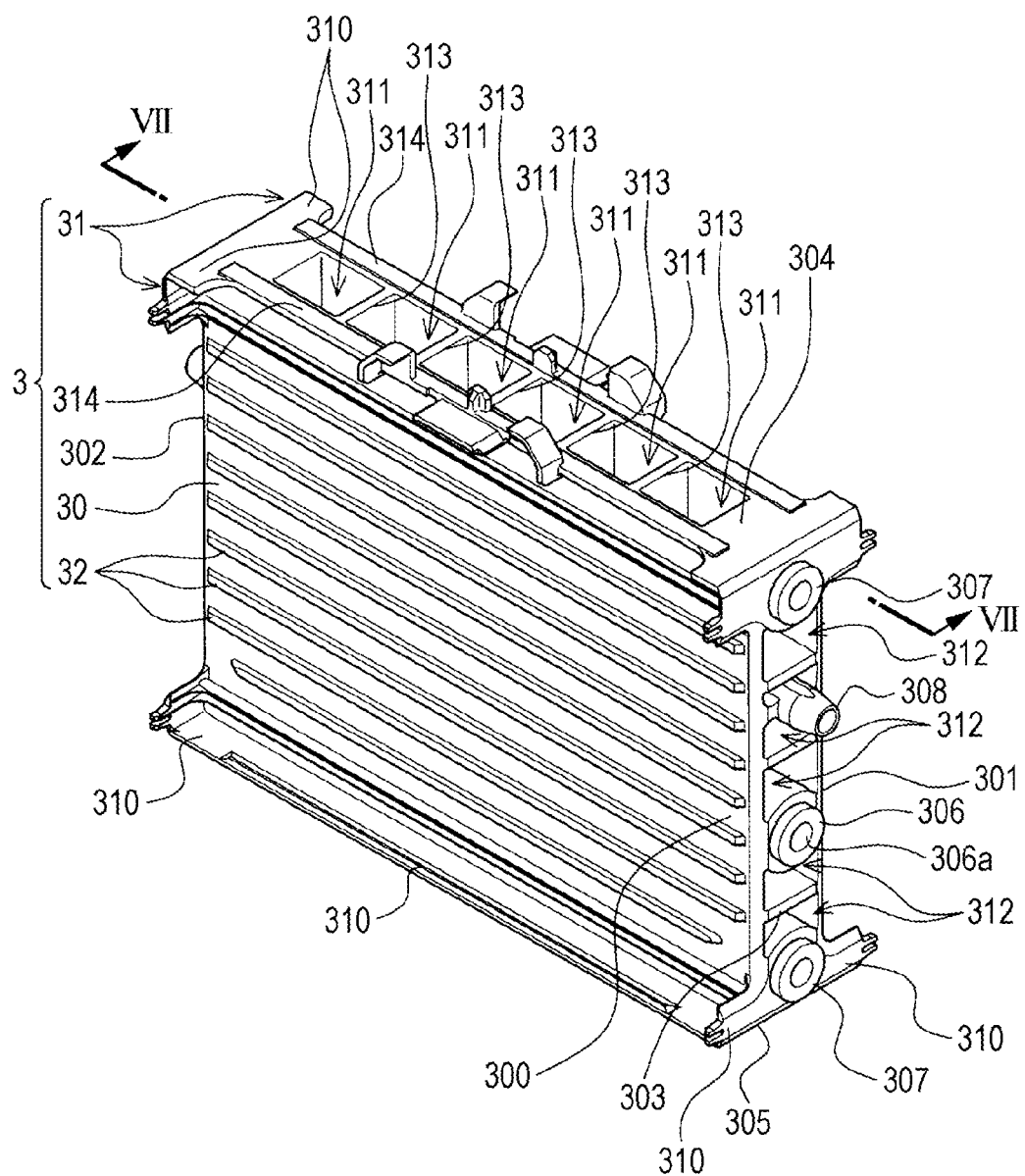
FIG. 5 is an entire perspective view of a first adjacent member used in the energy storage apparatus as viewed from a first surface side.
Figure 6:
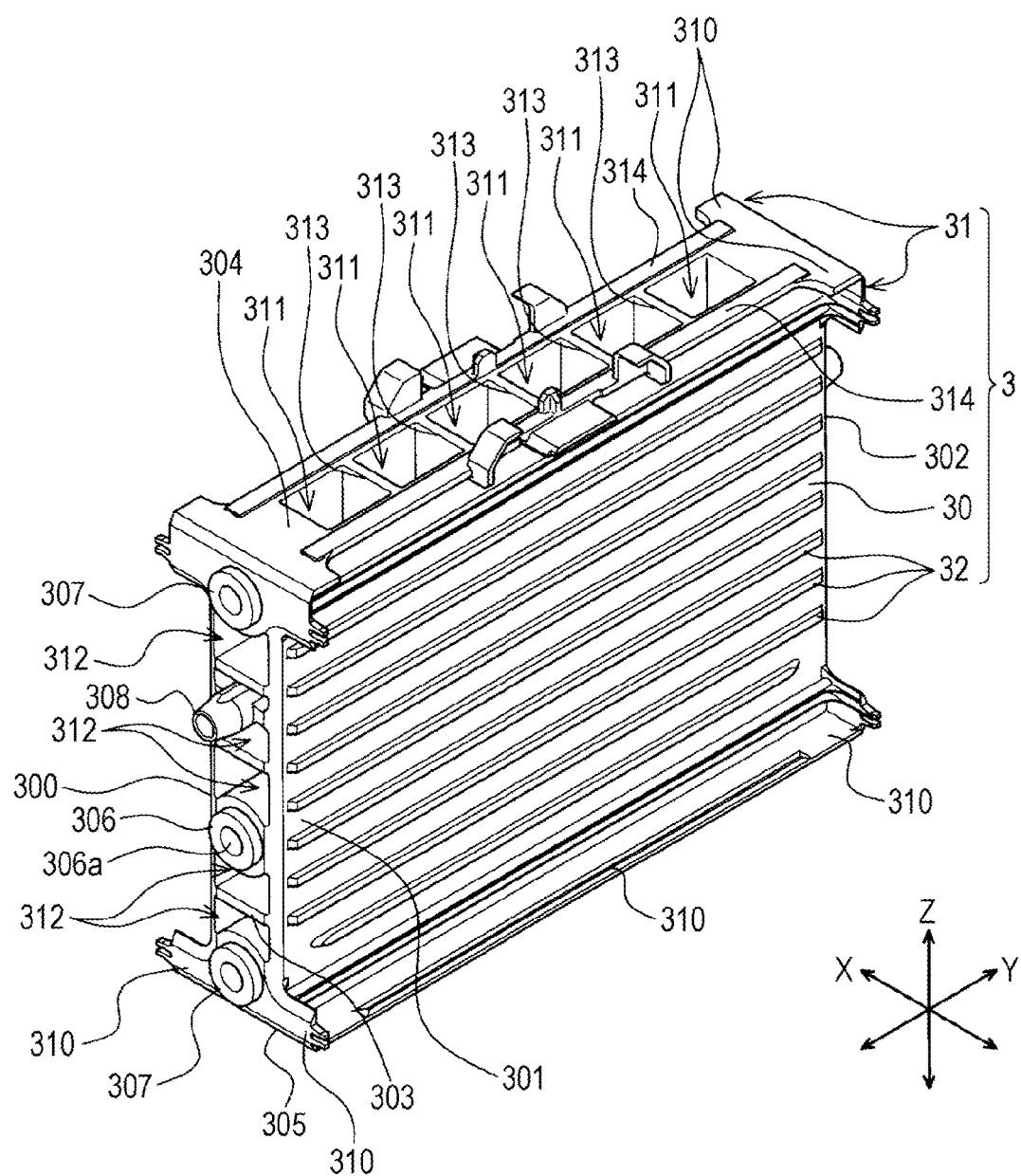
FIG. 6 is an entire perspective view of the first adjacent member used in the energy storage apparatus as viewed from a second surface side.

To describe the respective constitutional elements more specifically, as shown in FIG. 4 to FIG. 6, the first adjacent member 3 has a body portion (hereinafter referred to as "first body portion") 30 disposed adjacently to the energy storage device 2 disposed at the intermediate position in the X axis direction. That is, the first adjacent member 3 has the first body portion 30 disposed between two energy storage devices 2 disposed adjacently to each other at the intermediate position in the X axis direction.

As shown in FIG. 5 and FIG. 6, the first adjacent member 3 includes restricting portions (hereinafter referred to as "first restricting portions") 31 which prevent the positional displacement of the energy storage devices 2 disposed adjacently to the first body portion 30. In this embodiment, the first adjacent member 3 includes projecting portions 32 provided for forming flow channels which allow cooling air for cooling the energy storage device 2 to pass through between the first adjacent member 3 and the energy storage device 2 disposed adjacently to the first adjacent member 3.

The first body portion 30 has a first surface 300 and a second surface 301 disposed on a side opposite to the first surface 300 in the X axis direction. The first body portion 30 is formed into a quadrangular shape as viewed in the X axis direction. That is, the first body portion 30 is formed to have substantially the same shape and the same size as an outer surface of the case 20 of the energy storage device 2 which is directed in the X axis direction. The first body portion 30 has a thickness in the X axis direction. Accordingly, the first body portion 30 has a first end portion 302 and a second end portion 303 which is disposed on a side opposite to the first end portion 302 in the Y axis direction. The first body portion 30 also has a third end portion 304 and a fourth end portion 305 which is disposed on a side opposite to the third end portion 304 in the Z axis direction.

Figure 7:
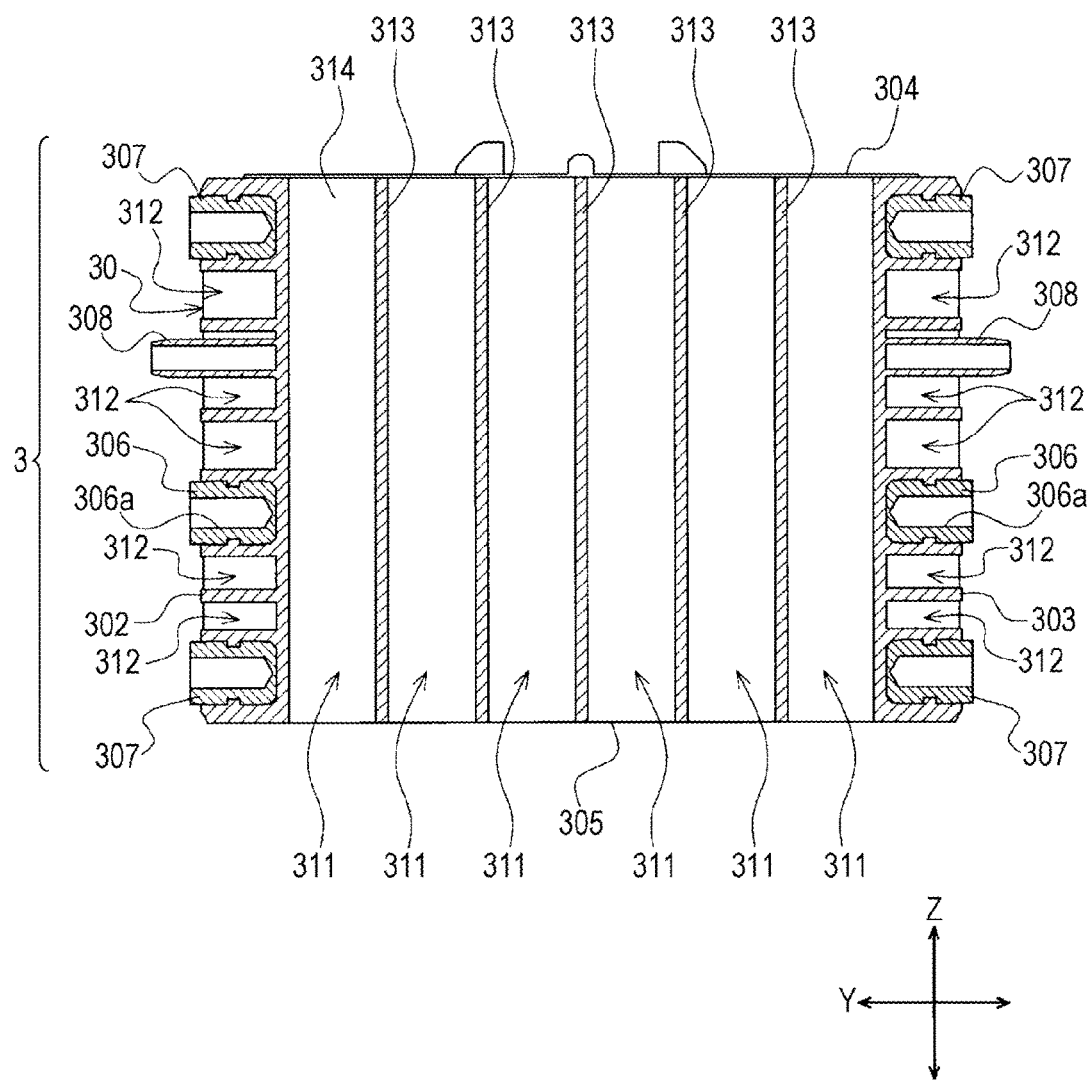
FIG. 7 is a cross-sectional view taken along a line VII-VII in FIG. 5.

The first body portion 30 includes connection portions (hereinafter referred to as "first connection portions") 306 which are connected to the holder 6 (opposedly facing member 60) on the end portions thereof in the Y axis direction. In this embodiment, as shown in FIG. 5 to FIG. 7, the first body portion 30 includes the first connection portion 306 on both end portions thereof in the Y axis direction. That is, the first body portion 30 includes at least a pair of first connection portions 306. The pair of first connection portions 306 is arranged symmetrically with respect to an imaginary line (a center line of the first body portion 30) extending in the Z axis direction.

In this embodiment, the first body portion 30 includes connection portions (hereinafter referred to as "second connection portions") 307 to which air supply ducts (not shown in the drawing) through which cooling air for cooling the energy storage device 2 is supplied are connected. The first body portion 30 includes the second connection portions 307 on both end portions thereof in the Y axis direction. That is, the first body portion 30 includes at least a pair of second connection portions 307. Each of the pair of second connection portions 307 is disposed at a position displaced from the first connection portion 306 in the Z axis direction, and the pair of second connection portions 307 is arranged symmetrically with respect to an imaginary line (the center line of the first body portion 30) extending in the Z axis direction.

In this embodiment, the first connection portions 306 and the second connection portions 307 are parts made of metal. Portions of the first adjacent member 3 other than the first connection portions 306 and the second connection portions 307 are made of a resin.

To be more specific, the first connection portion 306 is a female threaded member made of metal, and is embedded in a resin portion around the first connection portion 306 (a resin portion of the first body portion 30) in a state where a threaded hole 306a (the center of the screw) is directed in the Y axis direction. One first connection portion 306 is disposed on one end portion of the first body portion 30 in the Y axis direction, and slightly projects from the first end portion 302 of the first body portion 30. The other first connection portion 306 is disposed on the other end portion of the first body portion 30 in the Y axis direction, and slightly projects from the second end portion 303 of the first body portion 30. With such a configuration, threaded holes 306a of the pair of first connection portions 306 open in the opposite directions. The threaded hole 306a of the first connection portion 306 is a hole which forms a part of the fixing portion 11. That is, the threaded hole 306a of the first connection portion 306 is a hole of the fixing portion 11 into which the male threaded portion 111 of the shaft-like member (male threaded member) 110 is inserted (threadedly engaged).

The second connection portion 307 is a female threaded member made of metal, and is embedded in a resin portion around the second connection portion 307 in a state where a threaded hole (the center of the screw) is directed in the Y axis direction. One second connection portion 307 is disposed on one end portion of the first body portion 30 in the Y axis direction, and slightly projects from the first end portion 302 of the first body portion 30. The other second connection portion 307 is disposed on the other end portion of the first body portion 30 in the Y axis direction, and slightly projects from the second end portion 303 of the first body portion 30. With such a configuration, the threaded holes of the pair of second connection portions 307 open in the directions opposite to each other.

In this embodiment, the first adjacent member 3 includes the shaft portions 308 which are engaged with the holders 6 respectively. That is, the first adjacent member 3 includes the shaft portions 308 which form the engaging portions 10. To be more specific, the first adjacent member 3 includes the shaft portions 308 which project from the end portions of the first body portion 30 in the Y axis direction respectively. In this embodiment, the first adjacent member 3 includes the shaft portions 308 which project from both end portions of the first body portion 30 in the Y axis direction (the first end portion 302 and the second end portion 303) respectively. The pair of shaft portions 308 disposed on both end portions of the first body portion 30 has an axis which extends in the Y axis direction respectively, and the pair of shaft portions 308 is coaxially disposed. The first body portion 30 includes the first connection portion 306 and the second connection portion 307 on each end portion thereof in the Y direction so that each shaft portion 308 is disposed at a position which avoids the first connection portion 306 and the second connection portions 307. In this embodiment, each shaft portion 308 is disposed between the first connection portion 306 and the second connection portion 307.

The first body portion 30 includes: first cavity portions 311 which open on the end portions of the first body portion 30 in the Z axis direction (the third end portion 304 and the fourth end portion 305) and extend in the Z axis direction; and second cavity portions 312 which open on the end portions of the first body portion 30 in the Y axis direction (the first end portion 302 and the second end portion 303) at positions displaced from the first connection portions 306 in the Z axis direction, and extend in the Y axis direction. The first body portion 30 includes the plurality of first cavity portions 311. The plurality of first cavity portions 311 are arranged in a row in the Y axis direction.

The first body portion 30 includes the first connection portions 306 which are formed on both end portions thereof in the Y axis direction so that the first body portion 30 includes: the second cavity portions 312 which open on one end portion of the first body portion 30 in the Y axis direction (first end portion 302); and the second cavity portions 312 which open on the other end portion of the first body portion 30 in the Y axis direction (second end portion 303). The first cavity portions 311 are through holes, while the second cavity portions 312 are non-through holes. The first cavity portions 311 and the second cavity portions 312 are not communicated with each other.

To describe the configuration more specifically, in this embodiment, each first cavity portion 311 is formed into a quadrangular shape as viewed in the Z axis direction. The plurality of respective first cavity portions 311 have substantially the same shape as viewed in the Z axis direction. The plurality of first cavity portions 311 are disposed between both end portions of the first body portion 30 in the Y axis direction where the first connection portion 306 is provided respectively. That is, the plurality of first cavity portions 311 are disposed at positions which avoid the end portions of the first body portion 30 in the Y axis direction where the first connection portion 306 is provided respectively.

On the other hand, the second cavity portions 312 are disposed at positions which avoid the first connection portion 306 in the Z axis direction. In this embodiment, the first body portion 30 includes the second connection portions 307 and the shaft portion 308 on the respective end portions thereof. Accordingly, the second cavity portions 312 are disposed at positions which avoid the first connection portion 306, the second connection portions 307 and the shaft portion 308 on each end portion of the first body portion 30. To be more specific, the first connection portion 306, the second connection portions 307 and the shaft portion 308 are disposed in a spaced-apart manner from each other in the Z axis direction. Accordingly, the second cavity portion 312 is disposed between the first connection portion 306 and the second connection portion 307, between the shaft portion 308 and the second connection portion 307, and between the first connection portion 306 and the shaft portion 308.

With such a configuration, the first body portion 30 is configured such that a plurality of plate-like ribs 313 each of which expands in the X axis direction as well as in the Z axis direction are formed at intervals in the Y axis direction in a state where each rib 313 is disposed between each two of the first cavity portions 311 which are arranged in a row in the Y axis direction. That is, the first body portion 30 includes: a pair of partition wall portions 314 which face each other in the X axis direction with a distance therebetween; and the ribs 313 which connect the pair of partition wall portions 314 with each other, and the pair of partition wall portions 314 and the ribs 313 form the first cavity portions 311.

The first body portion 30 further includes: solid portions which support the first connection portions 306; solid portions which support the second connection portions 307; and solid portions which support the shaft portions 308. These solid portions are connected to the pair of partition wall portions 314 thus forming the second cavity portions 312 in cooperation with the pair of partition wall portions 314.

As shown in FIG. 5 and FIG. 6, the first restricting portion 31 includes a restricting member 310 extending in the X axis direction along an outer edge of the first body portion 30. To describe the configuration more specifically, the first adjacent member 3 includes the pairs of first restricting portions 31 which restrict two energy storage devices 2 disposed adjacently to the first adjacent member 3 in the X axis direction. The respective restricting members 310 of each pair of first restricting portions 31 extend in the directions opposite to each other in the X axis direction from the first body portion 30. That is, the restricting member 310 of one first restricting portion 31 extends toward the outside in the X axis direction from the first surface 300 of the first body portion 30, while the restricting member 310 of the other first restricting portion 31 extends toward the outside in the X axis direction from the second surface 301 of the first body portion 30.

The respective restricting members 310 of the pair of first restricting portions 31 are disposed along four corners (four corner portions) of at least the first body portion 30 respectively. That is, the respective restricting members 310 of each pair of first restricting portions 31 are respectively disposed along a first corner portion which includes an intersection point between the first end portion 302 and the third end portion 304 of the first body portion 30, a second corner portion which includes an intersection point between the second end portion 303 and the third end portion 304 of the first body portion 30, a third corner portion which includes an intersection point between the first end portion 302 and the fourth end portion 305 of the first body portion 30, and a fourth corner portion which includes an intersection point between the second end portion 303 and the fourth end portion 305 of the first body portion 30.

In the first adjacent member 3 in this embodiment, the restricting members 310 disposed along the first corner portion and the restricting members 310 disposed along the second corner portion are independent from each other, while the restricting members 310 disposed along the third corner portion and the restricting members 310 disposed along the fourth corner portion are continuously connected to each other by way of restricting members 310 extending along the fourth end portion 305.

With such a configuration, the restricting members 310 of the first restricting portions 31 are arranged in peripheries of the cases 20 of the energy storage devices 2 disposed adjacently to the first adjacent member 3 thus restricting the movement of the energy storage devices 2 in the Y axis direction as well as in the Z axis direction.

In the first adjacent member 3, the projecting portions 32 are formed on both surfaces of the first body portion 30 in the X axis direction. That is, the first adjacent member 3 includes: the projecting portions 32 which project from the first surface 300 of the first body portion 30; and the projecting portions 32 which project from the second surface 301 of the first body portion 30. In this embodiment, the first adjacent member 3 includes the plurality of projecting portions 32 formed on the first surface 300 and the second surface 301 of the first body portion 30 respectively.

The plurality of respective projecting portions 32 extend in the Y axis direction, and are arranged at intervals in the Z axis direction. Heights of the plurality of projecting portions 32 on a common surface (the first surface 300 or the second surface 301) are set to the same height. That is, the height of the plurality of projecting portions 32 is set to a height at which the plurality of projecting portions 32 are uniformly brought into contact with a planar outer surface directed in the X axis direction of the case 20 of the energy storage device 2 which is disposed adjacently to the first adjacent member 3. With such a configuration, each of the plurality of projecting portions 32 on the common surface (the first surface 300 or the second surface 301) forms a flow channel between one projecting portion 32 and another projecting portion 32 disposed adjacently to one projecting portion 32.

Figure 8:
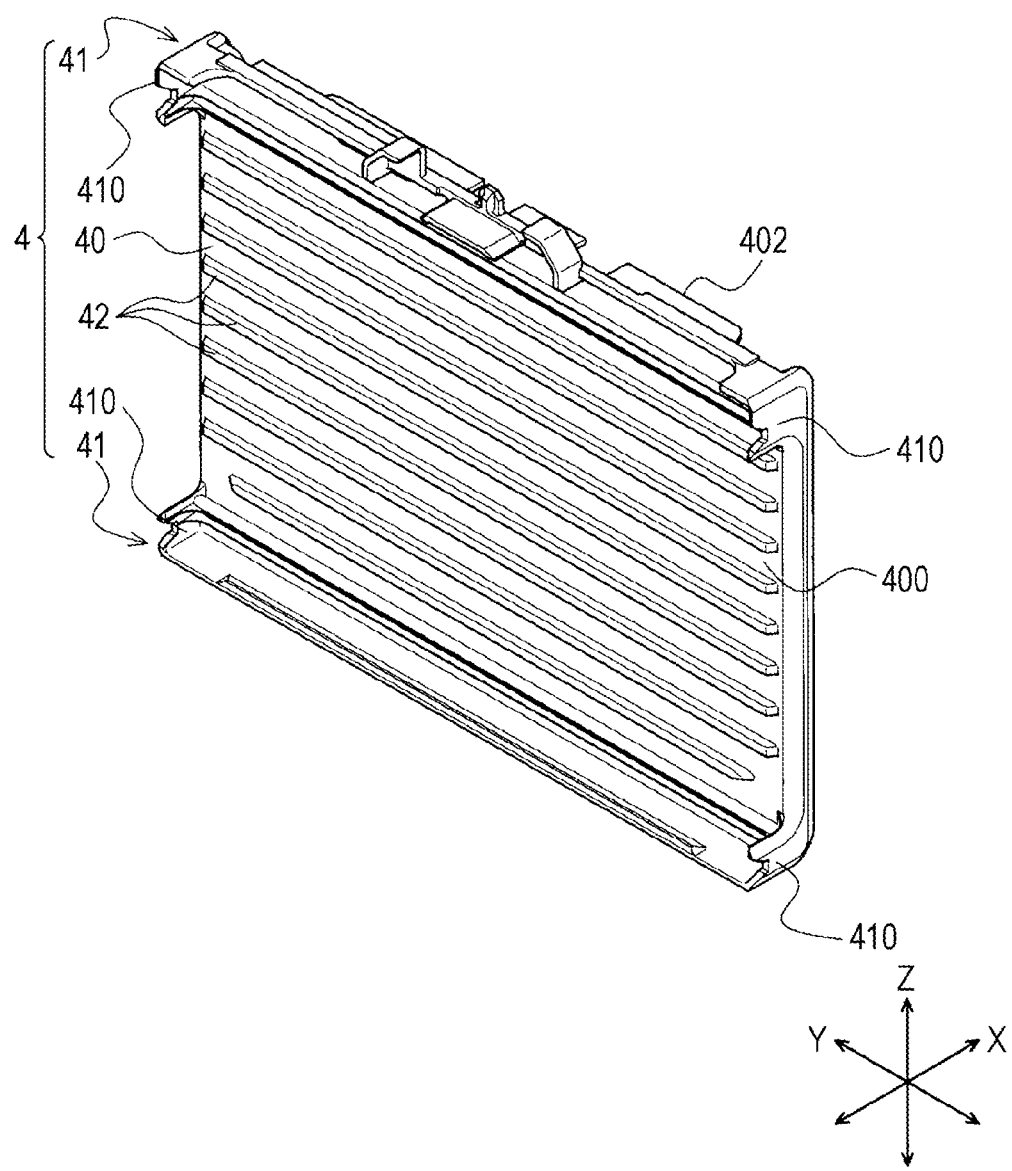
FIG. 8 is an entire perspective view of a second adjacent member used in the energy storage apparatus as viewed from a first surface side.
Figure 9:
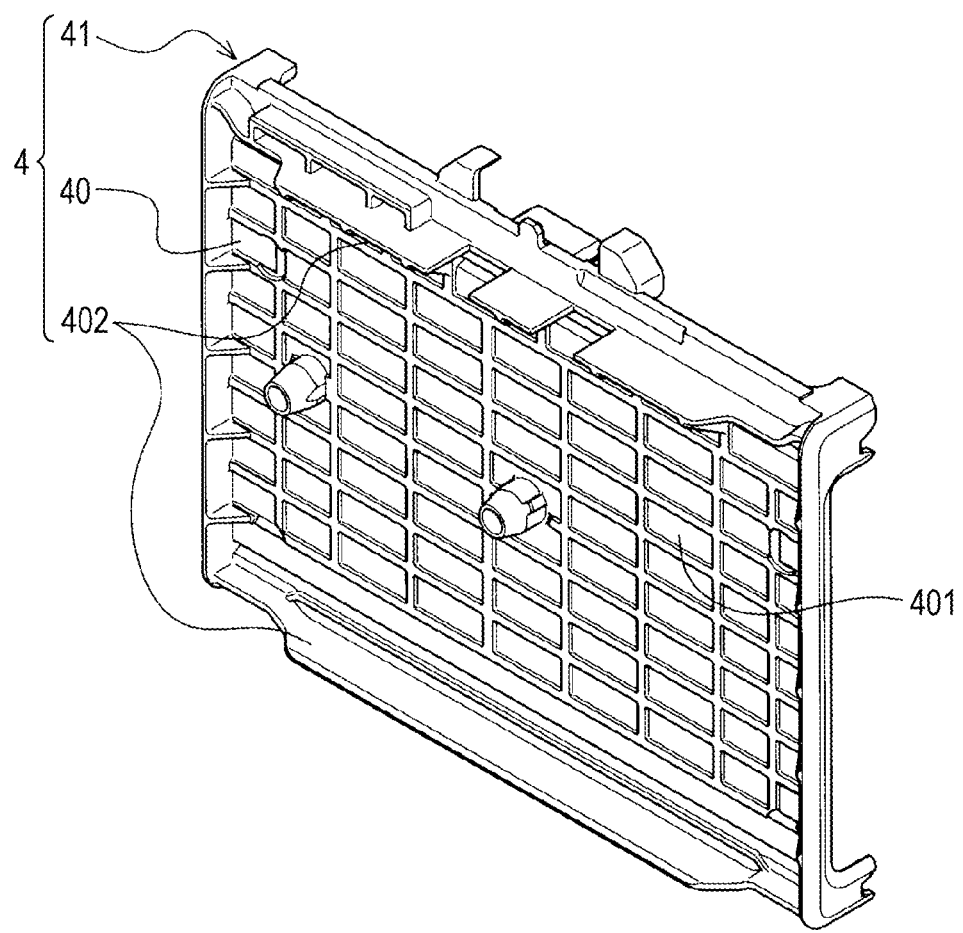
FIG. 9 is an entire perspective view of the second adjacent member used in the energy storage apparatus as viewed from a second surface side.

As shown in FIG. 8 and FIG. 9, each second adjacent member 4 has the body portion (hereinafter referred to as "second body portion") 40 disposed adjacently to the energy storage device 2 disposed at the outermost end in the X axis direction of the unit formed of the plurality of energy storage devices 2.

The second adjacent member 4 includes restricting portions (hereinafter referred to as "second restricting portions") 41 which prevent the positional displacement of the energy storage device 2 disposed adjacently to the second body portion 40. In this embodiment, the second adjacent member 4 includes projecting portions 42 provided for forming flow channels which allow cooling air for cooling the energy storage device 2 to pass therethrough between the second adjacent member 4 and the energy storage device 2 disposed adjacently to the second adjacent member 4.

The second body portion 40 has a first surface 400 and a second surface 401 disposed on a side opposite to the first surface 400 in the X axis direction. The second body portion 40 is formed into a quadrangular shape as viewed in the X axis direction. That is, the second body portion 40 is formed to have substantially the same shape and the same size as a surface of the case 20 of the energy storage device 2 which is directed in the X axis direction.

In this embodiment, the second adjacent member 4 includes positioning portions 402 provided for positioning the second adjacent member 4 with respect to the holder 6. To be more specific, the second adjacent member 4 includes the positioning portions 402 which are engageable with the holder 6 (an end member 61 described later) disposed adjacently to the second adjacent member 4 in the X axis direction, and project in the X axis direction from the second surface 401 of the second body portion 40 (see FIG. 9).

As shown in FIG. 8, each second restricting portion 41 includes a restricting member 410 extending in the X axis direction along an outer edge of the second body portion 40. The restricting member 410 of the second restricting portion 41 extends toward the outside in the X axis direction from the first surface 400 of the second body portion 40. The restricting member 410 of the second restricting portion 41 is disposed along at least four corners (four corner portions) of the second body portion 40 respectively. With such a configuration, the restricting members 410 of the second restricting portions 41 are arranged in a periphery of the case 20 of the energy storage device 2 disposed adjacently to the second adjacent member 4 thus restricting the movement of the energy storage device 2 in the Y axis direction as well as in the Z axis direction.

In the second adjacent member 4, the projecting portions 42 are formed on the first surface 400 of the second body portion 40 which is directed in the X axis direction. In this embodiment, the second adjacent member 4 includes the plurality of projecting portions 42 on the first surface 400 of the second body portion 40. The plurality of respective projecting portions 42 extend in the Y axis direction, and are arranged at intervals in the Z axis direction. Heights of the plurality of projecting portions 42 on a common surface (the first surface 400) are set to the same height. That is, the height of the plurality of projecting portions 42 is set to a height at which the plurality of projecting portions 42 are uniformly brought into contact with a planar outer surface directed in the X axis direction of the case 20 of the energy storage device 2 which is disposed adjacently to the second adjacent member 4. With such a configuration, each of the plurality of projecting portions 42 on the common surface (the first surface 400) forms a flow channel between one projecting portion 42 and another projecting portion 42 disposed adjacently to one projecting portion 42.

Figure 10:
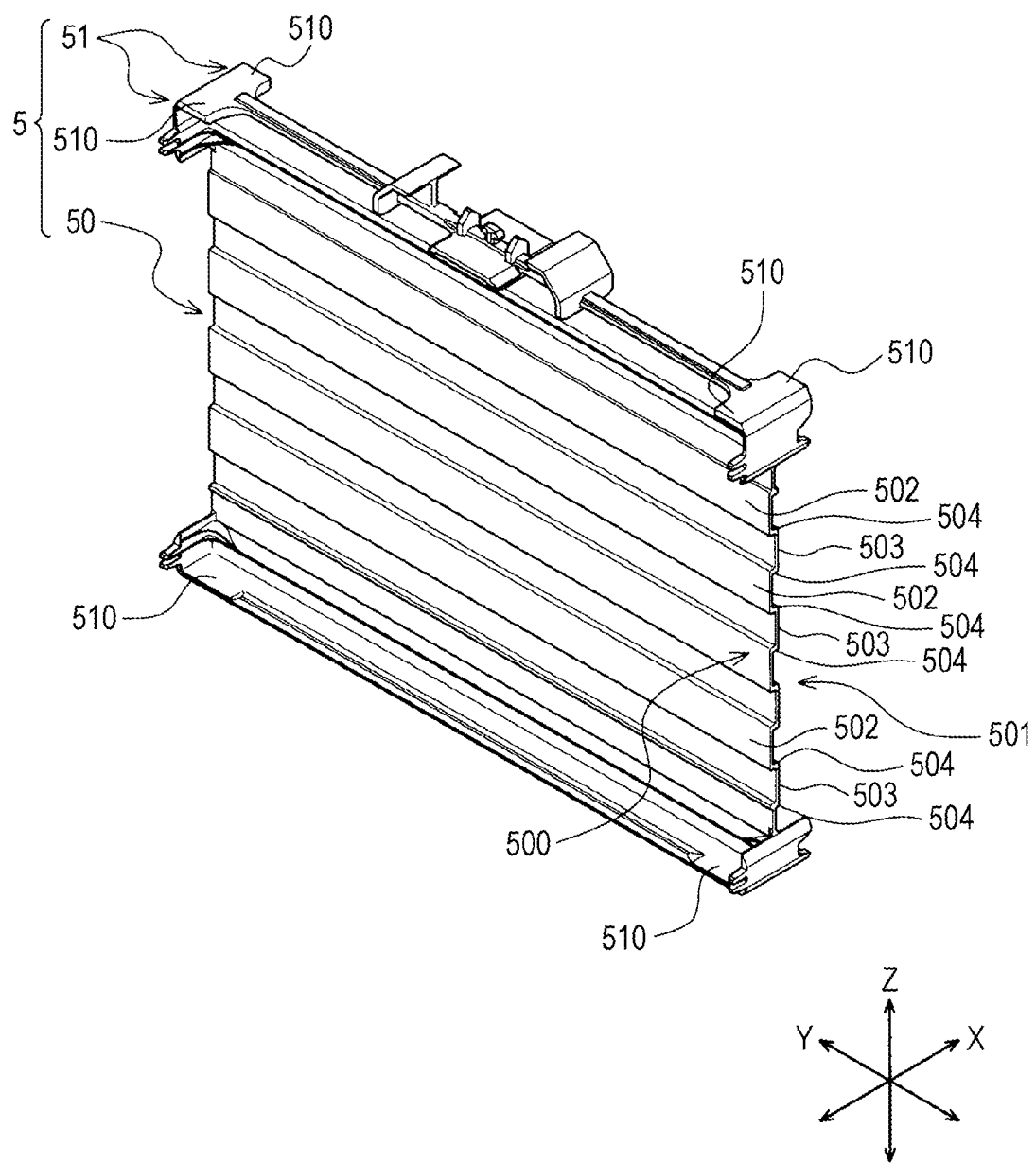
FIG. 10 is an entire perspective view of a third adjacent member used in the energy storage apparatus as viewed from a first surface side.
Figure 11:
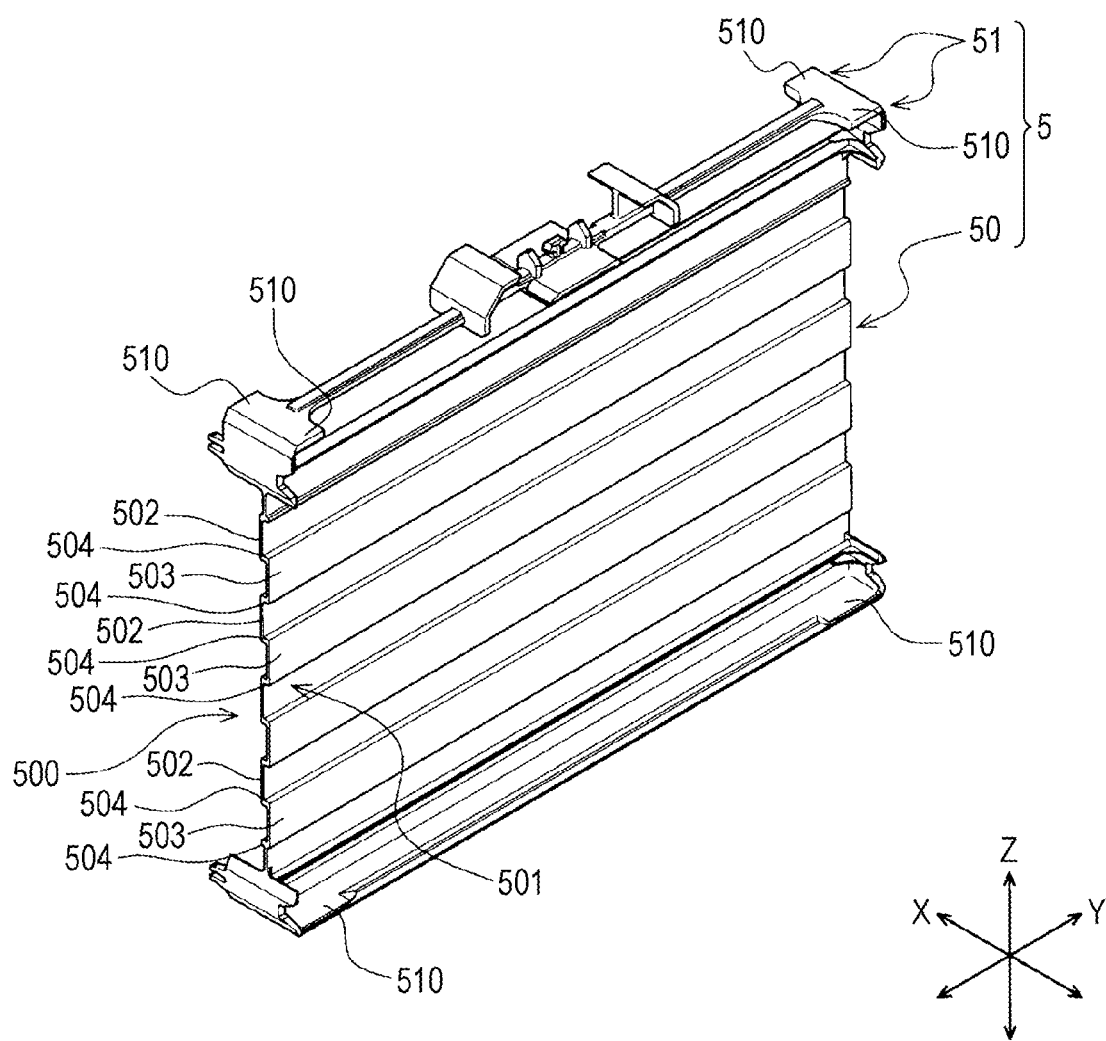
FIG. 11 is an entire perspective view of the third adjacent member used in the energy storage apparatus as viewed from a second surface side.

As shown in FIG. 10 and FIG. 11, each third adjacent member 5 has the body portion (hereinafter referred to as "third body portion") 50 disposed adjacently to the energy storage device 2 disposed between the first adjacent member 3 and the second adjacent member 4. That is, each third adjacent member 5 has the third body portion 50 disposed between two energy storage devices 2 disposed adjacently to each other between the first adjacent member 3 and the second adjacent member 4. The third adjacent member 5 includes restricting portions (hereinafter referred to as "third restricting portions") 51 which prevent the positional displacement of the energy storage devices 2 disposed adjacently to the third body portion 50.

The third body portion 50 has a first surface 500 and a second surface 501 disposed on a side opposite to the first surface 500 in the X axis direction. The third body portion 50 is formed into a quadrangular shape as viewed in the X axis direction. That is, the third body portion 50 is formed to have substantially the same shape and the same size as the surface of the case 20 of the energy storage device 2 which is directed in the X axis direction. The third body portion 50 has a rectangular corrugated shape in cross section as viewed in the Y axis direction.

To be more specific, the third body portion 50 includes: a plurality of first contact portions 502; a plurality of second contact portions 503; and a plurality of connection portions 504. The plurality of first contact portions 502 are arranged at intervals in the Z axis direction, and are brought into contact with the case 20 of the energy storage device 2 disposed adjacently to the third adjacent member 5 on one side in the X axis direction. The plurality of second contact portions 503 are positioned between the plurality of first contact portions 502 such that the second contact portion 503 and the first contact portion 502 are alternately arranged, and the second contact portions 503 are displaced in the X axis direction with respect to the first contact portions 502, and are brought into contact with the case 20 of the energy storage device 2 disposed adjacently to the third adjacent member 5 on the other side in the X axis direction. Each of the plurality of connection portions 504 connects edge portions of the first contact portion 502 and the second contact portion 503 which correspond to each other in the Z axis direction to each other. With such a configuration, the third body portion 50 forms flow channels which allow cooling air for cooling the energy storage device 2 to pass therethrough between the connection portions 504 arranged at intervals in the Z axis direction (between the case 20 of the energy storage device 2 disposed adjacently to the third adjacent member 5 on one side and the second contact portions 503 and between the case 20 of the energy storage device 2 disposed adjacently to the third adjacent member 5 on the other side and the first contact portions 502).

The third restricting portion 51 includes restricting members 510 extending in the X axis direction along an outer edge of the third body portion 50. To describe the configuration more specifically, the third adjacent member 5 includes the pairs of third restricting portions 51 which restrict two energy storage devices 2 disposed adjacently to the third adjacent member 5 in the X axis direction.

The respective restricting members 510 of each pair of third restricting portions 51 extend in the directions opposite to each other in the X axis direction from the third body portion 50. That is, the restricting member 510 of one third restricting portion 51 extends toward the outside in the X axis direction from the first surface 500 of the third body portion 50, while the restricting member 510 of the other third restricting portion 51 extends toward the outside in the X axis direction from the second surface 501 of the third body portion 50. The restricting members 510 of the pair of third restricting portions 51 are disposed along at least four corners (four corner portions) of the third body portion 50 respectively. With such a configuration, the restricting members 510 of the third restricting portions 51 are arranged in peripheries of the cases 20 of the energy storage devices 2 disposed adjacently to the third adjacent member 5 thus restricting the movement of the energy storage devices 2 in the Y axis direction as well as in the Z axis direction.

In this embodiment, each third adjacent member 5 is engaged by fitting with another third adjacent member 5 disposed adjacently to the third adjacent member 5 with the energy storage device 2 interposed therebetween in a contact state or in a non-contact state. That is, the third restricting portions 51 (restricting members 510) of one third adjacent member 5 are engaged by fitting with the third restricting portions 51 (restricting members 510) of another third adjacent member 5 with the energy storage device 2 interposed therebetween in a contact state or in a non-contact state.

Each third adjacent member 5 disposed adjacently to the first adjacent member 3 with the energy storage device 2 interposed therebetween is engaged by fitting with the first adjacent member 3 in a contact state or in a non-contact state. That is, the third restricting portions 51 (restricting members 510) of each third adjacent member 5 disposed adjacently to the first adjacent member 3 with the energy storage device 2 interposed therebetween are engaged by fitting with the first restricting portions 31 (restricting members 310) of the first adjacent member 3 in a contact state or in a non-contact state.

Each third adjacent member 5 disposed adjacently to the second adjacent member 4 with the energy storage device 2 interposed therebetween is engaged by fitting with the second adjacent member 4 in a contact state or in a non-contact state. That is, the third restricting portions 51 (restricting members 510) of each third adjacent member 5 disposed adjacently to the second adjacent member 4 with the energy storage device 2 interposed therebetween are engaged by fitting with the second restricting portions 41 (restricting members 410) of the second adjacent member 4 in a contact state or in a non-contact state.

Returning to FIG. 2, the holder 6 includes: the oppositely facing members 60 each of which oppositely faces the plurality of energy storage devices 2 in the Y axis direction; and the end members 61 which are connected to the oppositely facing members 60 and sandwich the energy storage devices 2 together with the first adjacent member 3.

To be more specific, the holder 6 includes: the pair of oppositely facing members 60; and the pair of end members 61. The pair of oppositely facing members 60 is disposed such that the oppositely facing members 60 sandwich the plurality of energy storage devices 2 therebetween in the Y axis direction, and the pair of oppositely facing members 60 extends in the X axis direction respectively. The pair of end members 61 is disposed such that the end members 61 are made to overlap with the respective second adjacent members 4 from the outside in the X axis direction, and each of the pair of end members 61 is connected to the pair of oppositely facing members 60.

Each of the pair of oppositely facing members 60 includes: a pair of beam portions 600 each extending in the X axis direction which is disposed in a spaced-apart manner in the Z axis direction; a first connection portion 601 which connects the pair of beam portions 600 to each other at an intermediate position in the X axis direction and supports the first adjacent member 3; and a pair of second connection portions 602 each of which connects end portions of the pair of beam portions 600 to each other and to which the end members 61 are respectively connected. In this embodiment, each oppositely facing member 60 includes third connection portions 603 which connect the pair of beam portions 600 to each other between the first connection portion 601 and the second connection portions 602.

Each of the pair of beam portions 600 is disposed along corner portions of the cases 20 of the plurality of energy storage devices 2 arranged in a row in the X axis direction. Accordingly, each of the pair of beam portions 600 is formed into a bent shape in cross section in conformity with the corner portions of the cases 20. To be more specific, each of the pair of beam portions 600 includes a strip-shaped first piece 604 and a strip-shaped second piece 605. The first piece 604 has a first end and a second end disposed on a side opposite to the first end of the first piece 604 in the Z axis direction. The first piece 604 extends in the X axis direction. The second piece 605 has a first end and a second end in the Y axis direction, wherein the first end of the second piece 605 is connected to the first end of the first piece 604, and the second end of the second piece 605 is disposed on a side opposite to the first end of the second piece 605. The second piece 605 extends in the X axis direction. The first piece 604 of the beam portion 600 opposedly faces outer surfaces of the cases 20 of the energy storage devices 2 which is directed in the Y axis direction, and the second piece 605 of the beam portion 600 opposedly faces outer surfaces of the cases 20 of the energy storage devices 2 which is directed in the Z axis direction.

The first connection portion 601 extends in the Z axis direction. The first connection portion 601 has through holes 606, 607, 608 at positions which correspond to the first connection portion 306, the second connection portions 307, and the shaft portion 308 of the first adjacent member 3. That is, the first connection portion 601 has: the first through hole 606 which corresponds to the first connection portion 306; the second through holes 607 which correspond to the second connection portions 307; and the third through hole 608 which corresponds to the shaft portion 308. The first through hole 606 is formed such that the shaft-like member 110 (the male threaded portion 111 of the male threaded member 110 which is threadedly engaged with the first connection portion 306) can pass through the first through hole 606. Each of the second through holes 607 is formed such that a male threaded member (not shown in the drawing) which is threadedly engaged with the second connection portion 307 can pass through the second through hole 607. The third through hole 608 which corresponds to the shaft portion 308 is formed such that the shaft portion 308 can be inserted into the third through hole 608 and an inner peripheral surface of the third through hole 608 which defines the third through hole 608 is engaged with an outer peripheral surface of the inserted shaft portion 308. That is, the third through hole 608 is a hole which forms a part of the engaging portion 10. In this embodiment, a size of the third through hole 608 is set such that the shaft portion 308 can be loosely inserted into the third through hole 608. With such setting, the shaft portion 308 is inserted into the third through hole 608 in a state where a gap is formed between the outer peripheral surface of the shaft portion 308 and the inner peripheral surface of the third through hole 608 which defines the third through hole 608. In this embodiment, the shaft portion 308 is inserted into the third through hole 608 in a state where a gap is formed in the Z axis direction between the outer peripheral surface of the shaft portion 308 and the inner peripheral surface of the third through hole 608 which defines the third through hole 608. To be more specific, the third through hole 608 is formed of an elongated hole which extends in the Z axis direction, and allows the movement and the rotation of the inserted shaft portion 308.

Each second connection portion 602 has: a connection piece 609 which is connected to the first pieces 604 of the pair of beam portions 600; and a fixed piece 610 which extends in the Y axis direction from the connection piece 609 and is fixed to the end member 61. Each fixed piece 610 covers the end member 61 which is made to overlap with the second adjacent member 4 from the outside. Along with such a configuration, the fixed piece 610 has through holes 611 through which male threaded members for connecting (fixing) the fixed piece 610 to the end member 61 are made to pass.

In this embodiment, each oppositely facing member 60 is formed into a frame shape by the beam portions 600, the first connection portion 601, the second connection portions 602, and the third connection portions 603. That is, the oppositely facing member 60 defines ventilation openings 613 which allow cooling air to pass therethrough in the Y axis direction.

Each of the pair of end members 61 is formed with substantially the same shape and the same size as the second body portion 40 of the second adjacent member 4 as viewed in the X axis direction. The end member 61 is formed such that the end member 61 is brought into face contact with the fixed pieces 610 of the second connection portions 602 of the oppositely facing members 60. Along with such a configuration, the end member 61 has threaded holes 612 with which male threaded members 115 are threadedly engaged at positions which correspond to the through holes 611 formed in the fixed pieces 610. To fix the energy storage apparatus 1 according to this embodiment to equipment of an automobile or the like which uses the energy storage apparatus 1 as a power source, each end member 61 has fixing members (male threaded members in this embodiment) 620 for fixing the energy storage apparatus 1 to the equipment.

Each holder 6 is made of a material having conductivity (metal in general). Accordingly, each insulator 7 provides electrical insulation between the plurality of energy storage devices 2 arranged in a row in the X axis direction and the holder 6. That is, the insulator 7 covers at least a region of the oppositely facing member 60 which oppositely faces the plurality of energy storage devices 2. In this embodiment, the insulator 7 covers the entire second pieces 605 of the pair of beam portions 600 which extend in the X axis direction in addition to surfaces of the pair of beam portions 600, surfaces of the first connection portion 601, surfaces of the second connection portions 602 and surfaces of the third connection portions 603 which are directed to an energy storage device 2 side.

The bus bars 8, 9 are disposed such that each bus bar 8, 9 straddles over the external terminals 21 of two energy storage devices 2 disposed adjacently to each other in the X axis direction. In this embodiment, the bus bar 8, 9 is mechanically and electrically connected to the external terminals 21 by welding. In this embodiment, the energy storage apparatus 1 includes the first adjacent member 3, and the first adjacent member 3 divides the plurality of energy storage devices 2 into two blocks. Accordingly, the energy storage apparatus 1 includes, as bus bars, the first bus bars 8 each of which connects two energy storage devices 2 within the same block to each other, and the second bus bar 9 which is provided between the energy storage devices 2 disposed adjacently to each other with the first adjacent member 3 interposed therebetween, and is provided for connecting the energy storage devices belonging to two blocks to each other.

The first bus bars 8 and the second bus bar 9 are mechanically and electrically connected by welding to the external terminals 21 of the energy storage devices 2 which are objects to be connected to each other. The external terminals 21 of the plurality of energy storage devices 2 are disposed at the same level in the Z axis direction. Accordingly, the first bus bars 8 which connect the energy storage devices 2 to each other within the same block are formed into a plate shape. The second bus bar 9 is formed into a shape where a center portion of the second bus bar 9 is raised from both end portions of the second bus bar 9 so as to straddle over the first adjacent member 3.

Figure 12:
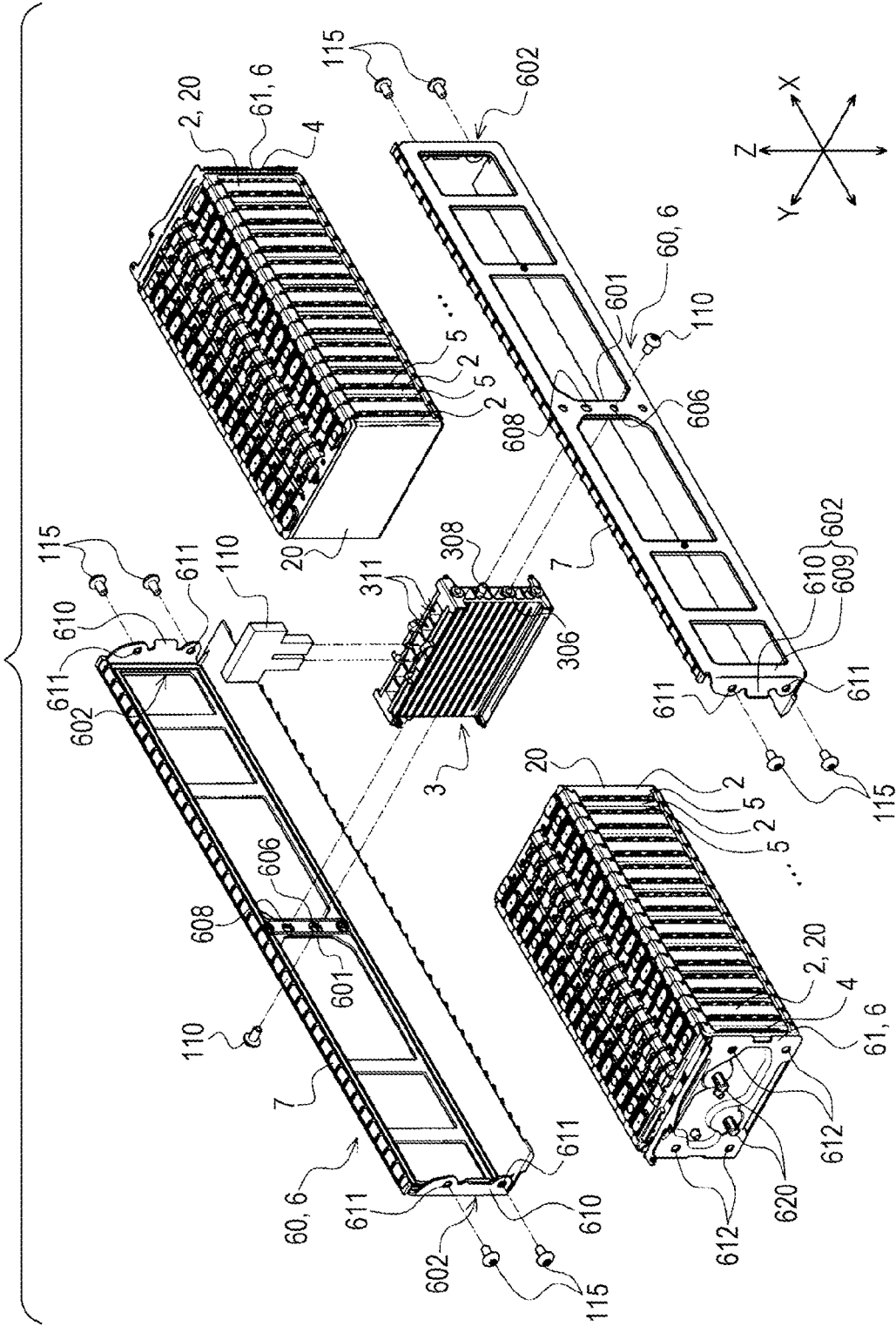
FIG. 12 is a perspective view for describing a method of manufacturing the energy storage apparatus.

The energy storage apparatus 1 according to this embodiment has the configuration as described above. Next, a method of manufacturing the energy storage apparatus 1 is described. First, as shown in FIG. 12, the first adjacent member 3 is held by a jig 100 by inserting the jig 100 into first cavity portions 311 of the first adjacent member 3. Then, the jig 100 is maintained at a fixed position so that the first adjacent member 3 maintains a posture where the first adjacent member 3 can be connected to opposedly facing members 60 and energy storage devices 2 can be disposed along the first body portion 30. In such a state, the energy storage devices 2 are disposed adjacently to the first adjacent member 3 in the X axis direction. In this embodiment, the energy storage device 2 is disposed in each of two regions divided by the first adjacent member 3 in the X axis direction, and each energy storage device 2 is disposed adjacently to the first adjacent member 3.

Then, in each of two regions formed by dividing all energy storage devices 2 in two in the X axis direction, the energy storage device 2 and the third adjacent member 5 are alternately arranged in the X axis direction. Then, the second adjacent members 4 are made to overlap with the cases 20 of the respective energy storage devices 2 disposed at the outermost ends, and the end members 61 are made to overlap with the respective second adjacent members 4.

In this embodiment, the energy storage devices 2 are disposed adjacently to the first adjacent member 3 and, thereafter, the energy storage device 2 and the third adjacent member 5 are sequentially and alternately made to overlap with each other and, then, the second adjacent members 4 and the end members 61 are made to overlap with each other. However, it may be possible to adopt the following configuration. That is, a single block is prepared by making the energy storage device 2 and the third adjacent member 5 alternately overlap with each other and by making the second adjacent members 4 and the end members 61 overlap with each other. Then the blocks may be arranged such that the energy storage device 2 is disposed adjacently to the first adjacent member 3.

As described above, the first adjacent member 3 is maintained by the jig 100 in a posture where the first adjacent member 3 can be connected to the opposedly facing members 60 of the holder 6. Accordingly, the first through holes 606 formed in the first connection portions 601 of the opposedly facing members 60 which are disposed adjacently to the first adjacent member 3 in the Y axis direction and the first connection portions 306 are made coaxial with each other.

Figure 13:
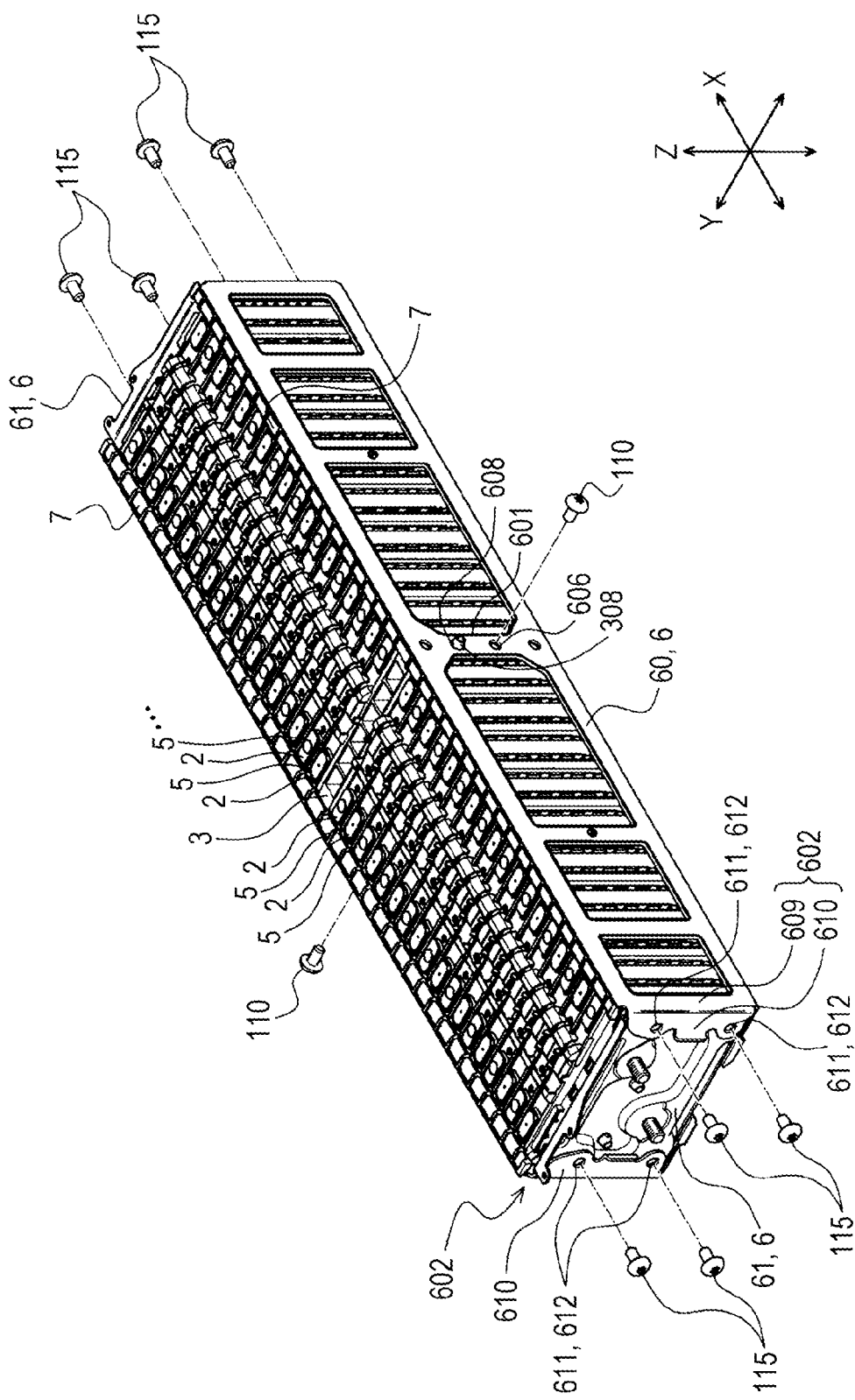
FIG. 13 is a perspective view for describing the method of manufacturing the energy storage apparatus.

In this embodiment, the first adjacent member 3 includes shaft portions 308 and hence, as described above, the shaft portions 308 of the first adjacent member 3 and third through holes 608 which are formed in the opposedly facing member 60 are also made coaxial with each other. Along with such a configuration, in this embodiment, as shown in FIG. 13, the shaft portions 308 are inserted into the third through holes (elongated holes) 608 as a pre-stage for making the male threaded members 110 threadedly engaged with each first connection portions 306 (for inserting the shaft-like members 110 into the respective first connection portions 306).

Figure 14:
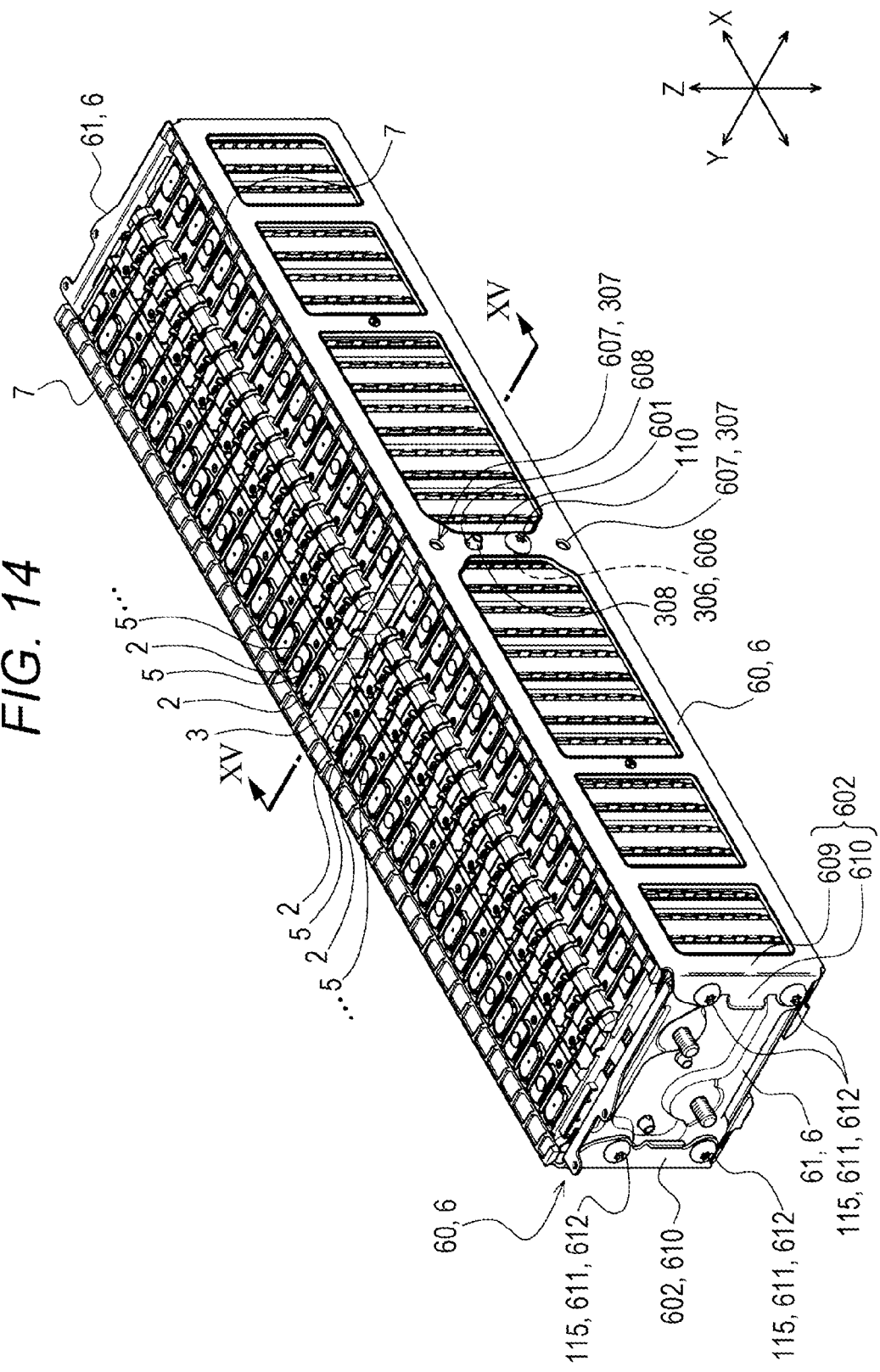
FIG. 14 is a perspective view for describing the method of manufacturing the energy storage apparatus.
Figure 15:
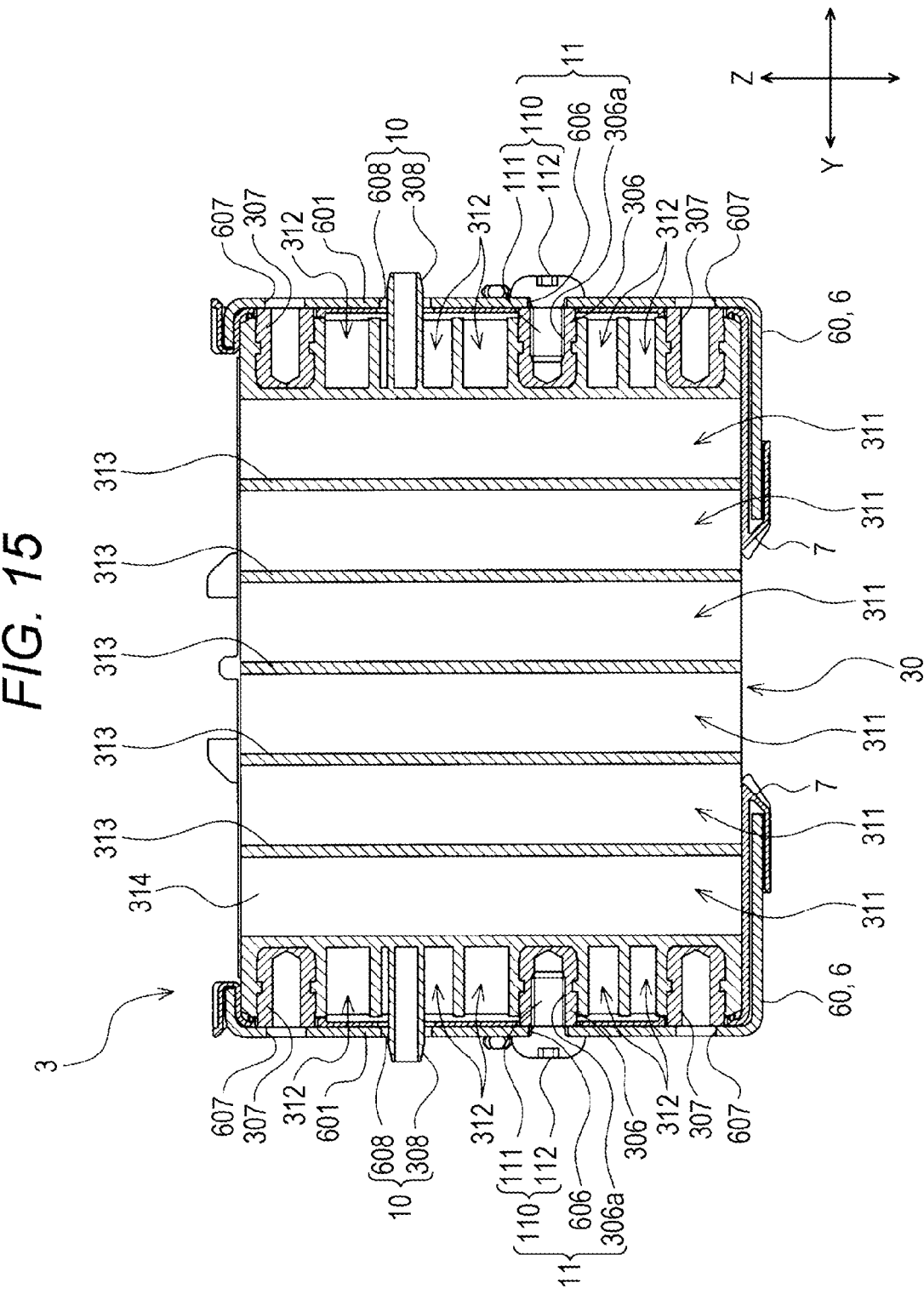
FIG. 15 is a cross-sectional view taken along a line XV-XV in FIG. 14.

Then, as shown in FIG. 14 and FIG. 15, the male threaded members 110 are made to pass through the first through holes 606 formed in the first connection portions 601, and are threadedly engaged with the first connection portions 306. In this embodiment, the male threaded members 110 are not completely fastened in this state so that the first adjacent member 3 is temporarily fixed to the opposedly facing members 60.

In this embodiment, the holder 6 includes the pair of opposedly facing members 60. Accordingly, the first connection portion 306 formed on one end portion of a first body portion 30 of first adjacent member 3 in the Y axis direction is temporarily fixed to one opposedly facing member 60. The first connection portion 306 formed on the other end portion of the first body portion 30 of the first adjacent member 3 in the Y axis direction is temporarily fixed to the other opposedly facing member 60. In this state, the first adjacent member 3 is maintained in a state where the first adjacent member 3 is rotatable about the shaft portions 308 and is movable in the Z axis direction. Insulators 7 are mounted on the opposedly facing members 60 in advance before the first adjacent member 3 is fixed (temporarily fixed) to the opposedly facing members 60.

When the first adjacent member 3 is temporarily fixed to the opposedly facing members 60 as described above, as shown in FIG. 14, a state is brought about where fixed pieces 610 of second connection portions 602 of the opposedly facing members 60 are made to overlap with the respective end members 61 from the outside.

In this state, the end members 61 and the opposedly facing members 60 are connected to each other. That is, the male threaded members 115 are made to pass through the through holes 611 formed in the fixed pieces 610, and are threadedly engaged with threaded holes 612 formed in the respective end members 61. By making the male threaded members 115 threadedly engaged with the threaded holes 612, the plurality of energy storage devices 2 are pressurized to the first adjacent member 3 by the end members 61 in a state where the plurality of energy storage devices 2 are positioned by the first adjacent member 3. That is, the first adjacent member 3 functions as a positioning member which performs the positioning of the energy storage devices 2.

The first adjacent member 3 is in a temporarily-fixed state with respect to the opposedly facing members 60 so that the posture or the position of the first adjacent member 3 can be changed corresponding to a pressurized state of the energy storage devices 2 using the shaft portions 308 loosely inserted into the first through holes 606 formed in the opposedly facing members 60 as the reference (fulcrum). When positions of the external terminals 21 of the plurality of energy storage devices 2 in the Z axis direction are not appropriate, the positions of the energy storage devices 2 in the Z axis direction are adjusted. In such a case, the temporarily-fixed first adjacent member 3 moves in the Z axis direction along the third through holes 608 each of which is formed of an elongated hole thus also allowing the adjustment of the arrangement of the energy storage devices 2. When the first adjacent member 3 assumes the appropriate posture and the appropriate arrangement as described above, a state is brought about where a pressure in the X axis direction is uniformly applied to the energy storage devices 2, the second adjacent members 4, the third adjacent members 5 and the end members 61. When the energy storage devices 2, the second adjacent members 4, the third adjacent members 5 and the end members 61 are brought into a pressurized state as described above, the male threaded members 110 which are threadedly engaged with the first connection portions 306 of the first adjacent member 3 are fastened and hence, the first adjacent member 3 is firmly fixed to the opposedly facing members 60 (holder 6).

Figure 16:
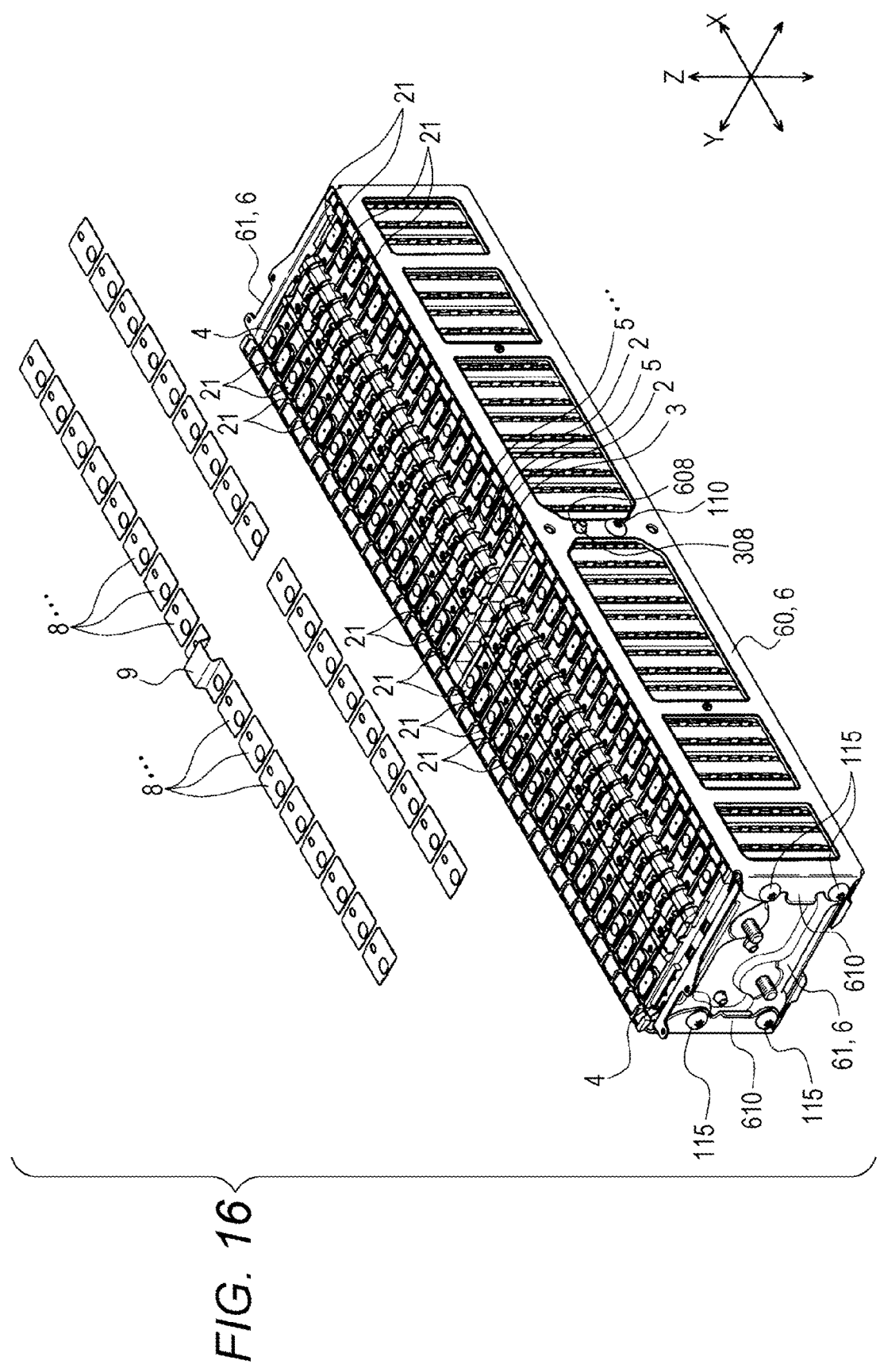
FIG. 16 is a perspective view for describing a method of manufacturing the energy storage apparatus.

Thereafter, as shown in FIG. 16, bus bars 8, 9 (the first bus bars 8, the second bus bar 9) are disposed such that each bus bar 8, 9 straddles over the external terminals 21 of two energy storage devices 2 disposed adjacently to each other, and is welded to the external terminals 21. With such operations, the energy storage apparatus 1 where the plurality of energy storage devices 2 are electrically connected to each other is completed (see FIG. 1). An air supply duct is connected to the energy storage apparatus 1 when the energy storage apparatus 1 is mounted on target equipment (automobile, for example). In connecting the air supply duct to the equipment, male threaded members which are made to pass through holes formed in the air supply duct are made to pass through second through holes 607 formed in the oppositely facing members 60, and are threadedly engaged with the energy storage apparatus 1 (second connection portions 307 of the first adjacent member 3). Accordingly, in the same manner as the male threaded members 110 threadedly engaged with the first connection portions 306, the male threaded members provided for connecting the air supply duct also has a function of connecting (fixing) the first adjacent member 3 to the oppositely facing members 60.

As described above, the energy storage apparatus 1 includes: the energy storage devices 2; the oppositely facing members 60 each of which oppositely faces the energy storage devices 2 in the Y axis direction (first direction); the first adjacent member 3 which oppositely faces the oppositely facing members 60 in the Y axis direction and is disposed adjacently to the energy storage devices 2 in the X axis direction (second direction) orthogonal to the Y axis direction; and the engaging portions 10 where the first adjacent member 3 and the oppositely facing member 60 are engaged with each other in a relatively movable manner. Accordingly, by allowing the relative movement between the first adjacent member 3 and the oppositely facing members 60, the first adjacent member 3 can be brought into an appropriate state. With such a configuration, the energy storage devices 2 are disposed adjacently to the first adjacent member 3 and hence, the energy storage devices 2 can be appropriately positioned.

The engaging portion 10 includes: the third through hole (hole) 608 which is formed in one of either the oppositely facing member 60 or the first adjacent member 3 and has an axis thereof extending in the Y axis direction (first direction); and the shaft portion 308 which is formed on the other of either the oppositely facing member 60 or the first adjacent member 3 and is inserted into the third through hole (hole) 608 in a state where a gap is formed between the outer peripheral surface of the shaft portion 308 per se and the inner peripheral surface which defines the third through hole (hole) 608. Accordingly, in the engaging portion 10, the shaft portion 308 is rotatable using the axis of the shaft portion 308 per se as the center of rotation, and is movable within the third through hole 608. With such a configuration, the first adjacent member 3 is rotatable about the shaft portions 308, and is movable corresponding to a movable range of each shaft portion 308 within the third through hole 608 (the distance between the outer peripheral surface of the shaft portion 308 and the inner peripheral surface which defines the third through hole (hole) 608). Accordingly, the first adjacent member 3 can be adjusted so as to assume the appropriate arrangement or the appropriate posture.

Particularly, each energy storage device 2 has the external terminals 21 on the end portion thereof in the Z axis direction (third direction), and each shaft portion 308 is inserted into the third through hole (hole) 608 in a state where a gap is formed in the third direction between the outer peripheral surface of the shaft portion 308 per se and the inner peripheral surface which defines the third through hole (hole) 608. Accordingly, a movable range of each shaft portion 308 in the Z axis direction is increased and hence, an adjustment allowable amount of the arrangement of the first adjacent member 3 is increased. Further, the first adjacent member 3 is moved in the Z axis direction and hence, the arrangement of the energy storage devices 2 disposed adjacently to the first adjacent member 3 is adjusted. With such a configuration, the external terminals 21 of each energy storage device 2 can be set at appropriate positions or an appropriate height. Accordingly, each bus bar 8, 9 (the first bus bar 8, the second bus bar 9) is appropriately connected to the external terminals 21 of the energy storage device 2.

To be more specific, when the bus bar 8, 9 is connected to the external terminals 21 of the energy storage devices 2 which are not disposed at appropriate positions, there may be a case where a bending action or a twisting action occurs in the bus bar 8, 9. When a bending action or a twisting action occurs in the bus bar 8, 9, an internal stress is generated in the bus bar 8, 9 so that a mechanical strength of the bus bar 8, 9 is affected. Assume a case where the external terminals 21 of the energy storage devices 2 and the bus bar 8, 9 are connected to each other by laser welding. In such a case, when the bus bar 8, 9 is connected to the external terminals 21 of the energy storage devices 2 which are not disposed at appropriate positions by laser welding, the position where the bus bar 8, 9 is to be welded and a focal position of a laser beam do not agree with each other and hence, a sufficient welding strength cannot be acquired.

However, in this embodiment, as described above, the arrangement of the first adjacent member 3 and the energy storage devices 2 can be adjusted by moving the first adjacent member 3 in the Z axis direction and hence, the external terminals 21 of the energy storage devices 2 can be disposed at appropriate positions or at an appropriate height. Accordingly, the bus bar 8, 9 can be connected to the external terminals 21 with a required welding strength without causing a bending action and a twisting action in the bus bar 8, 9.

The energy storage apparatus 1 includes the fixing portions 11 each of which fixes the first adjacent member 3 to the oppositely facing member 60, and the fixing portion 11 makes the oppositely facing member 60 and the first adjacent member 3 relatively non-movable to each other. With such a configuration, in a state where the first adjacent member 3 is brought into an appropriate state by allowing the relative movement between the oppositely facing member 60 and the first adjacent member 3, the fixing portion 11 brings the oppositely facing members 60 and the first adjacent member 3 into a relatively non-movable state and hence, the first adjacent member 3 is maintained in an appropriate state while holding the positional relationship with respect to the oppositely facing members 60. Accordingly, the energy storage devices 2 disposed adjacently to the first adjacent member 3 is also brought into an appropriate state.

Each fixing portion 11 includes the shaft-like member 110 which extends in the Y axis direction and extends over the oppositely facing member 60 and the first adjacent member 3, and the shaft-like member 110 is insertable or retractable with respect to at least the first adjacent member 3 and hence, the positioning and the adjustment of the first adjacent member 3 can be easily performed. That is, the shaft-like member 110 which extends in the Y axis direction and extends over the oppositely facing member 60 and the first adjacent member 3 interferes with both the oppositely facing member 60 and the first adjacent member 3 and hence, the rotation and the movement of the first adjacent member 3 are prevented. On the other hand, when the shaft-like member 110 is removed from at least the first adjacent member 3, the interference of the shaft-like member 110 with respect to the first adjacent member 3 is cancelled and hence, the rotation and the movement of the first adjacent member 3 are allowed whereby the posture and the arrangement of the first adjacent member 3 can be adjusted.

Particularly, each shaft-like member 110 is a male threaded member which includes the shaft-like male threaded portion 111 and the head portion 112 having a larger diameter than the male threaded portion 111, and the male threaded portion 111 is threadedly engaged with the first adjacent member 3 after the male threaded portion 111 is made to pass through the opposedly facing member 60. Accordingly, by fastening the male threaded member 110, the opposedly facing member 60 is brought into a state where the opposedly facing member 60 is clamped by the head portion 112 and the first adjacent member 3 so that the first adjacent member 3 is firmly fixed to the opposedly facing member 60 while maintaining an appropriate state.

That is, each engaging portion 10 includes: the third through hole (hole) 608 which is formed in the opposedly facing member 60, and has an axis thereof extending in the Y axis direction; and the shaft portion 308 which is formed on the first adjacent member 3 and is inserted into the third through hole (hole) 608 in a state where a gap is formed between outer peripheral surface of the shaft portion 308 per se and the inner peripheral surface which defines the third through hole (hole) 608. The fixing portion 11 includes: the male threaded portion 111 which is made to pass through the opposedly facing member 60; and the female threaded portion (the threaded hole 306a of the first connection portion 306) which is combined with the male threaded portion 111. The first adjacent member 3 includes the female threaded portion (the threaded hole 306a of the first connection portion 306). Accordingly, it is possible to perform the positional adjustment between the first adjacent member 3 and the energy storage devices 2 disposed adjacently to the first adjacent member 3 by loosening the male threaded portion 111 and the female threaded portion 306a which are combined with each other, while the first adjacent member 3 brought into an appropriate state is firmly fixed to the opposedly facing member 60 by fastening the male threaded portion 111 and the female threaded portion 306a which are combined with each other.

The method of manufacturing the energy storage apparatus 1 includes the steps of: providing the energy storage devices 2 which are disposed adjacently to the first adjacent member 3 in the X axis direction orthogonal to the Y axis direction out of the opposedly facing members 60 and the first adjacent member 3 which oppositely face each other in the Y axis direction and are engaged with each other in a relatively movable manner; and changing a relative position between the energy storage devices 2 and the opposedly facing members 60. When the relative position between the energy storage devices 2 and the opposedly facing members 60 is changed, the relative position between the first adjacent member 3 disposed adjacently to the energy storage devices 2 and the opposedly facing members 60 is also changed. Accordingly, when the first adjacent member 3 is brought into an appropriate state (arrangement or posture), the energy storage devices 2 disposed adjacently to the first adjacent member 3 is positioned appropriately.

Particularly, the opposedly facing members 60 and the first adjacent member 3 are made relatively non-movable after the relative position between the energy storage devices 2 and the opposedly facing members 60 is changed. Accordingly, it is possible to prevent the occurrence of a change in state of the first adjacent member 3 and the energy storage devices 2 which are brought into an appropriate state and hence, the first adjacent member 3 and the energy storage devices 2 can be maintained in an appropriate state.

The change in the relative position between the energy storage devices 2 and the opposedly facing members 60 includes the change in relative position between the energy storage devices 2 and the opposedly facing members 60 in the Z axis direction. Accordingly, the external terminals 21 of each energy storage device 2 can be disposed at appropriate positions or an appropriate height. With such a configuration, each external terminal 21 of the energy storage device 2 and the bus bar 8, 9 (the first bus bar 8, the second bus bar 9) can be appropriately connected to each other.

The present invention is not limited to the above-mentioned embodiment, and it is needless to say that various modifications are conceivable without departing from the gist of the present invention.

In the above-mentioned embodiment, the fixing portions 11 each of which fixes the first adjacent member 3 to the opposedly facing member 60 are provided. However, the present invention is not limited to such a configuration. For example, provided that the engaging portions 10 where the opposedly facing member 60 and the first adjacent member 3 are engaged with each other can resist a force (pressure) applied to the first adjacent member 3 in the X axis direction, and can maintain a connection state (engaged state) between the opposedly facing members 60 and the first adjacent member 3, the fixing portions 11 may be provided to the energy storage apparatus 1 when necessary.

In the above-mentioned embodiment, the first adjacent member 3 includes the pair of shaft portions 308 which project respectively from both end portions (the first end portion 302 and the second end portion 303) of the first body portion 30 in the Y axis direction, and are inserted into the holes 608 formed in the opposedly facing members 60 disposed on both sides of the first adjacent member 3 in the Y axis direction. However, the present invention is not limited to such a configuration.

That is, in the above-mentioned embodiment, the energy storage apparatus 1 includes the pair of engaging portions 10 each of which has: the hole 608 which is formed in one of either the opposedly facing member 60 or the first adjacent member 3 (the opposedly facing member 60 in the above-mentioned embodiment), and has a center axis thereof extending in the Y axis direction; and the shaft portion 308 which is formed on the other of either the opposedly facing member 60 or the first adjacent member 3 (the first adjacent member 3 in the above-mentioned embodiment), and is inserted into the hole 608 which is a counterpart of the shaft portion 308. However, the present invention is not limited to such a configuration.

The energy storage apparatus 1 may include plural pairs of engaging portions 10 each of which has: the hole 608 which is formed in one of either the opposedly facing member 60 or the first adjacent member 3, and has a center axis thereof extending in the Y axis direction; and the shaft portion 308 which is formed on the other of either the opposedly facing member 60 or the first adjacent member 3, and is inserted into the hole 608 which is a counterpart of the shaft portion 308.

Figure 18:
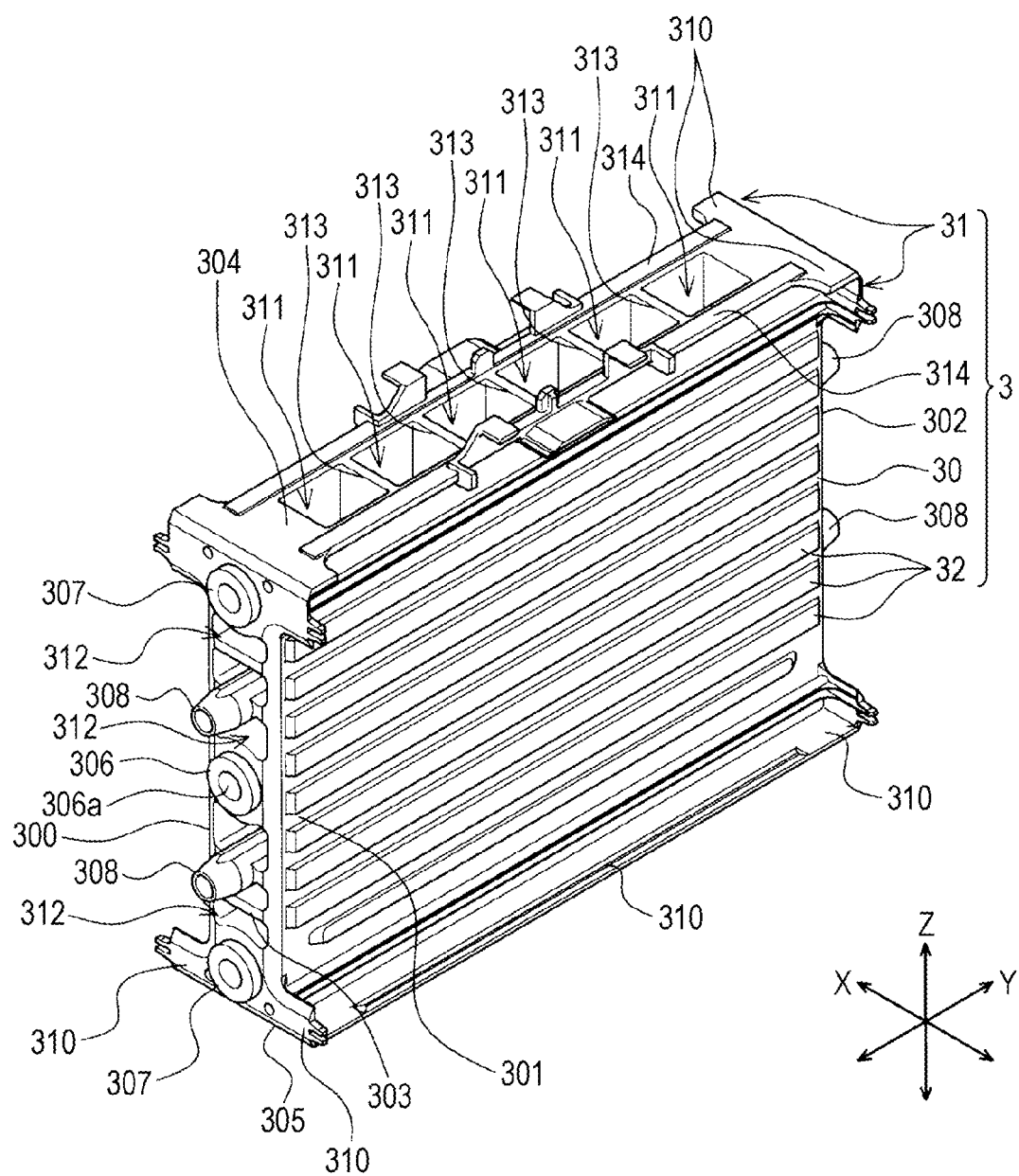
FIG. 18 is an entire perspective view of the first adjacent member used in the energy storage apparatus according to another embodiment as viewed from a second surface side.
Figure 19:
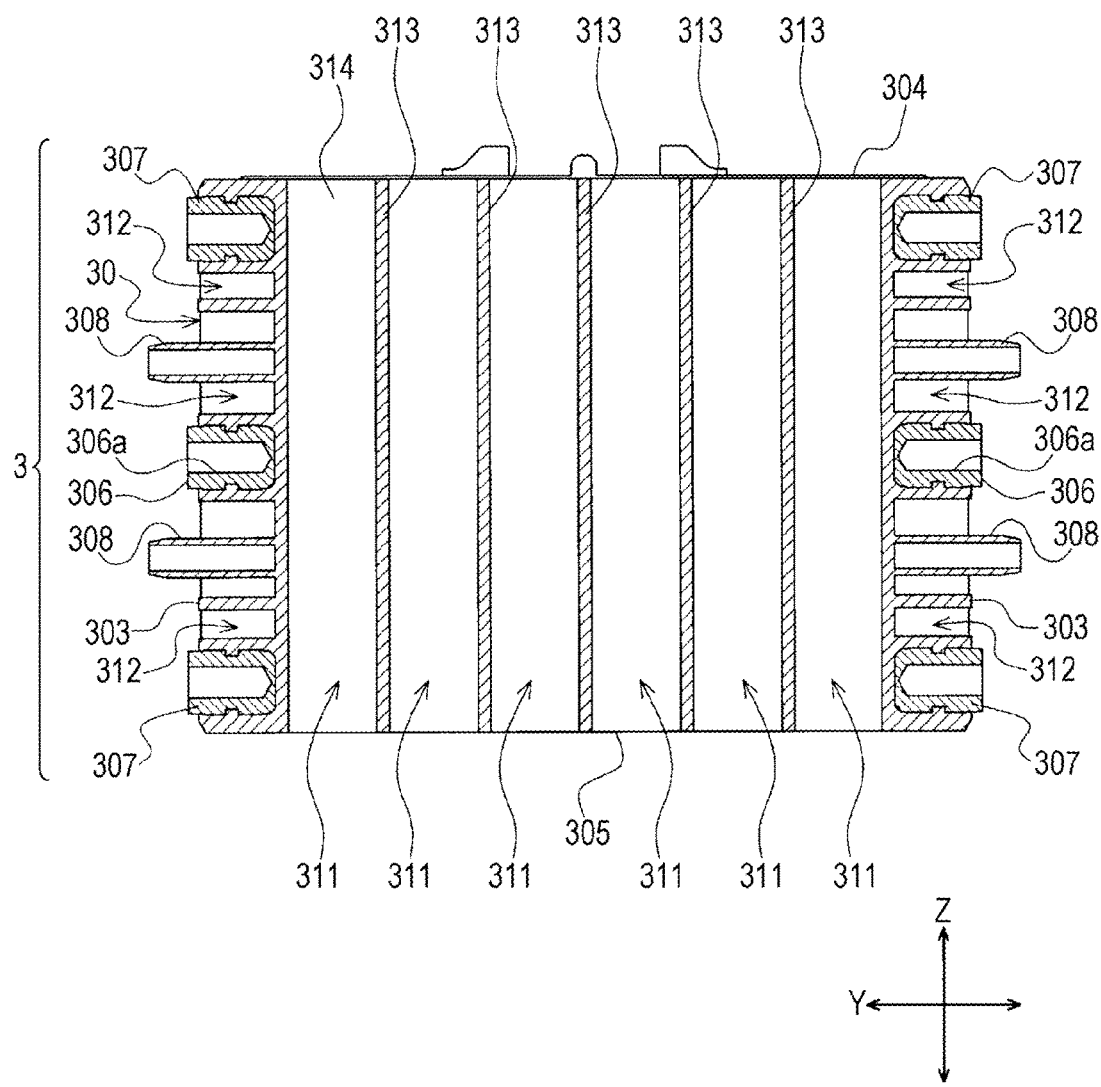
FIG. 19 is a cross-sectional view taken along a line XIX-XIX in FIG. 17.

In this case, for example, as shown in FIG. 17 to FIG. 19, the first adjacent member 3 includes a plural pairs of shaft portions 308 (two pairs of shaft portions 308 in FIG. 17 to FIG. 19) each pair of which projects from both end portions (the first end portion 302 and the second end portion 303) of the first body portion 30 in the Y axis direction. That is, the first adjacent member 3 includes: two or more shaft portions 308 (two shaft portions 308 in FIG. 17 to FIG. 19) formed on one end (first end portion 302) of the first adjacent member 3 in the Y axis direction; and two or more shaft portions 308 (two shaft portions 308 in FIG. 17 to FIG. 19) formed on the other end (second end portion 303) of the first adjacent member 3 in the Y axis direction. Two or more shaft portions 308 formed on each of one end and the other end of the first adjacent member 3 are disposed in a spaced-apart manner in the X axis direction or in the Z axis direction (in the Z axis direction in the drawing). Accordingly, each of the opposedly facing members 60 disposed on both sides of the first adjacent member 3 has the holes 608, the number and the arrangement of which correspond to the number and the arrangement of the shaft portions 308.

In the case where two or more shaft portions 308 are formed on each of one end and the other end of the first adjacent member 3, the first adjacent member 3 may have threaded holes 306a each of which is disposed between two shaft portions 308 disposed adjacently to each other in the X axis direction or in the Z axis direction (in the Z axis direction in the drawing), and each opposedly facing member 60 may have a hole 606 which corresponds to the threaded hole 306a and through which the male threaded portion 111 of the male threaded member 110 inserted into (threadedly engaged with) the threaded hole 306a is made to pass. That is, the energy storage apparatus 1 may include fixing portions 11 each of which fixes the first adjacent member 3 to the opposedly facing member 60, and is disposed between two engaging portions 10 disposed adjacently to each other in the X axis direction or in the Z axis direction (Z axis direction in the drawing).

Figure 20:
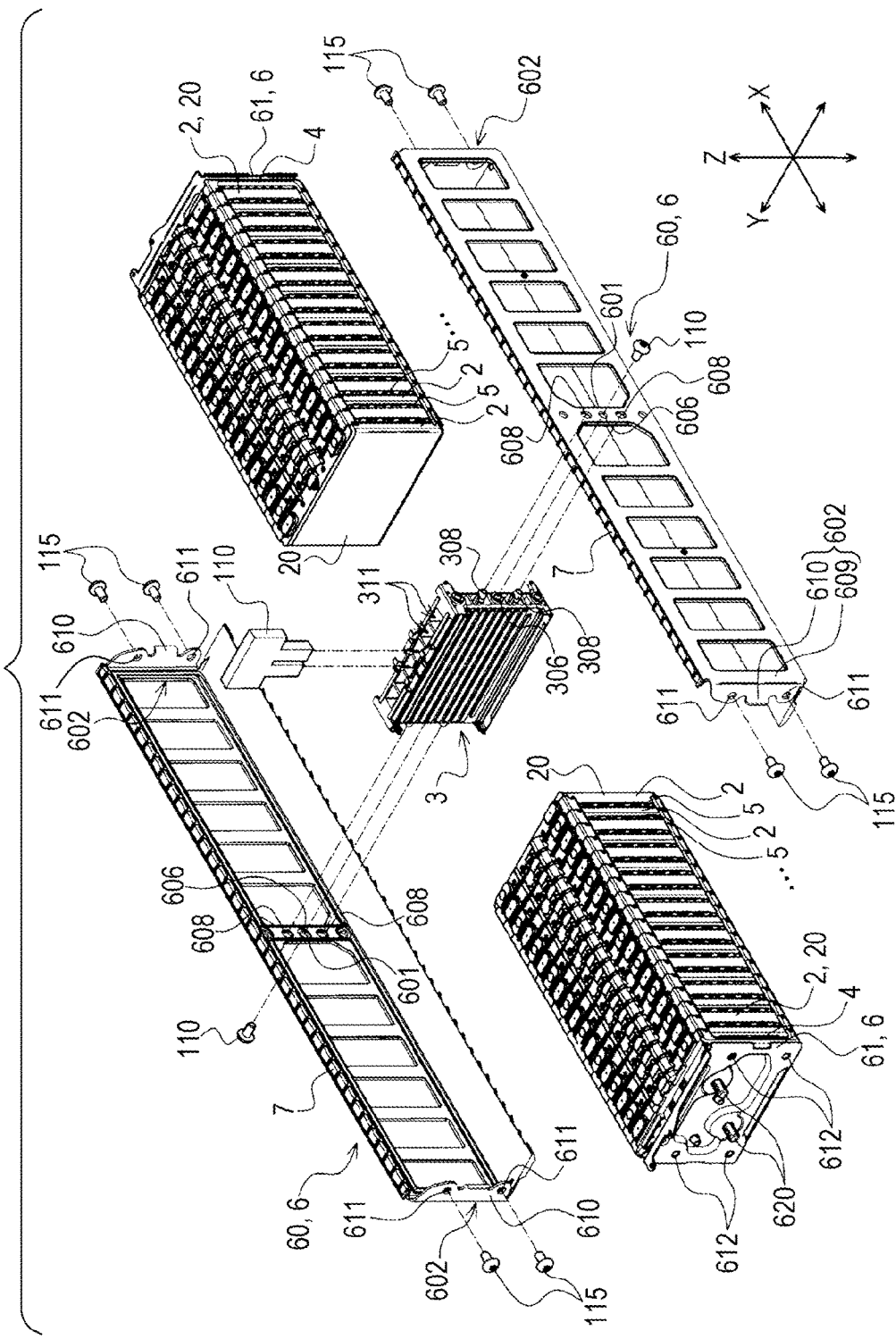
FIG. 20 is a perspective view for describing a method of manufacturing the energy storage apparatus according to another embodiment.

Also in this case, as shown in FIG. 20, by holding the first adjacent member 3 using a jig 100, the first adjacent member 3 maintains a posture thereof where the first adjacent member 3 can be connected to the opposedly facing members 60 and the energy storage devices 2 can be disposed along the first body portion 30. Accordingly, in this case, the energy storage apparatus 1 can be manufactured in the same steps as the energy storage apparatus 1 of the above-mentioned embodiment.

In the energy storage apparatus 1 having the above-mentioned configuration, two or more engaging portions 20 where the first adjacent member 3 and the opposedly facing member 60 are engaged with each other are provided in a spaced-apart manner in the X axis direction or in the Z axis direction. Accordingly, when a rotational force is applied to the first adjacent member 3 about a Y axis, the engaging portions 20 disposed adjacently to each other in the same row receive the rotational force. Accordingly, the energy storage apparatus 1 having the above-mentioned configuration is particularly effective when it is desirable to restrict the rotation of the first adjacent member 3 about the Y axis.

When a relative position between the energy storage devices 2 and the opposedly facing members 60 is adjusted only in the Z axis direction, it is sufficient that, in at least one of two or more engaging portions 20 (engaging portions 20 disposed in the same row) which are disposed in a spaced-apart manner, the outer peripheral surface of the shaft portion 308 and the inner peripheral surface of the hole (an elongated hole having a major axis extending in the Z axis direction) 608 into which the shaft portion 308 is inserted be in contact with each other in the X axis direction.

It is more preferable that, in only one engaging portion 20, the outer peripheral surface of the shaft portion 308 and the inner peripheral surface of the hole (the elongated hole having a major axis extending in the Z axis direction) 608 into which the shaft portion 308 is inserted be in contact with each other in the X axis direction. That is, it is sufficient that, in one engaging portion 20, the outer peripheral surface of the shaft portion 308 and the inner peripheral surface of the hole (the elongated hole having a major axis extending in the Z axis direction) 608 into which the shaft portion 308 is inserted be in contact with each other in the X axis direction, and a gap be formed between the outer peripheral surface of the shaft portion 308 and the inner peripheral surface of the hole 608 in the Z axis direction. It is sufficient that, in each of the remaining engaging portions 20, a gap be formed in the Z axis direction between the outer peripheral surface of the shaft portion 308 and the inner peripheral surface of the hole (an elongated hole having a major axis extending in the Z axis direction) 608 into which the shaft portion 308 is inserted.

It is more preferable that, in one engaging portion 20, the hole into which the shaft portion 308 is inserted be formed into an elongated circular shape or elliptical shape which extends in the X axis direction as viewed in the Y axis direction. Further, it is sufficient that, in each of the remaining engaging portions 20, the hole into which the shaft portion 308 is inserted be formed into a circular shape as viewed in the Y axis direction.

With such a configuration, assembling property of the first adjacent member 3 and the opposedly facing member 60 is enhanced compared to a case where the outer peripheral surface of the shaft portion 308 and the inner peripheral surface of the hole (the elongated hole having a major axis extending in the Z axis direction) 608 into which the shaft portion 308 is inserted are in contact with each other in all engaging portions 20.

In the above-mentioned embodiment, each engaging portion 10 includes: the shaft portion 308 which is formed integrally with the first body portion 30 of the first adjacent member 3 by molding; and the third through hole 608 formed in the first connection portion 601 of the opposedly facing member 60. However, the present invention is not limited to such a configuration.

For example, as shown in FIG. 21, a first adjacent member 3 may have: threaded holes 320 formed in the first body portion 30; and male threaded members 321 which are threadedly engaged with the threaded holes 320, and correspond to the shaft portions projecting from the first body portion 30, and each male threaded member 321 may be made to pass through the third through hole 608 formed in the first connection portion 601 of the opposedly facing member 60. That is, each engaging portion 10 may include: the male threaded member 321 as the shaft portion of the first adjacent member 3; and the through hole 608 formed in the opposedly facing member 60 through which the male threaded member 321 is made to pass. With such a configuration, the posture or the arrangement of the first adjacent member 3 is changed by allowing the relative movement between the first adjacent member 3 and the opposedly facing members 60 with reference to the male threaded members 321 and hence, the energy storage devices 2 can be positioned in an appropriate state.

In this case, the first adjacent member 3 is firmly fixed to the opposedly facing members 60 by fastening the male threaded members 321 and hence, the fixing portions 11 independent from the engaging portions 10 are not indispensable. That is, the engaging portions 10 can also be used as the fixing portions 11 and hence, it is sufficient to provide the fixing portions 11 independent from the engaging portions 10 to the energy storage apparatus 1 when necessary.

In the above-mentioned embodiment, each fixing portion 11 includes the male threaded members 110 as the shaft-like members. However, the present invention is not limited to such a configuration. For example, when the energy storage apparatus 1 includes the fixing portions 11, each fixing portion 11 may include a knock pin as the shaft-like member which is made to pass through the oppositely facing member 60 and is driven into the first adjacent member 3. In this case, the knock pin preferably includes: a shaft portion driven into the first adjacent member 3; and a head portion having a larger diameter than the shaft portion.

In the above-mentioned embodiment, each third through hole 608 into which the shaft portion 308 is inserted is formed of an elongated hole which extends in the Z axis direction. However, the present invention is not limited to such a configuration. For example, each third through hole 608 may be formed of a circular hole into which the shaft portion 308 is rotatably inserted. With such a configuration, the first adjacent member 3 changes a posture thereof (changes a posture thereof with respect to the oppositely facing members 60) by being rotated about the shaft portions 308 and hence, the energy storage devices 2 disposed adjacently to the first adjacent member 3 also assume an appropriate posture. In this case, provided that a size of each third through hole 608 is set such that the shaft portion 308 can be loosely inserted into the third through hole 608 (the shaft portion 308 can be inserted into the third through hole 608 in a state where a gap is formed (a gap exists) between the inner peripheral surface which defines the third through hole 608 and the outer peripheral surface of the shaft portion 308), besides the rotation of the first adjacent member 3 about the shaft portions 308, the arrangement of the first adjacent member 3 can also be changed within a range where each shaft portion 308 is movable in the third through hole 608. Accordingly, the energy storage devices 2 can be adjusted so as to assume an appropriate posture and an appropriate arrangement. It is not always necessary that the shaft portion 308 and the third through hole 608 have a circular shape as viewed in the direction along which a center line of the shaft portion 308 or a center line of the third through hole 608 extends. For example, at least either one of the shaft portion 308 or the third through hole 608 may have a non-circular shape as viewed in the direction along which the center line of the shaft portion 308 or the center line of the third through hole 608 extends.

In the above-mentioned embodiment, the first cavity portions 311 and the second cavity portions 312 are formed on the first body portion 30 of the first adjacent member 3. However, the present invention is not limited to such a configuration. For example, the entire first body portion 30 of the first adjacent member 3 may be formed of a solid body. That is, the first cavity portions 311 and the second cavity portions 312 may be formed on the first adjacent member 3 when necessary. However, it is needless to say that, from a viewpoint of suppressing the increase of a weight of the energy storage apparatus 1, the first cavity portions 311 and the second cavity portions 312 are preferably formed on the first adjacent member 3. Further, when the first cavity portions 311 and the second cavity portions 312 are formed on the first adjacent member 3, the arrangement, shapes or the like of the first cavity portions 311 and the second cavity portions 312 can be changed as desired.

In the above-mentioned embodiment, as the connection portions each of which is connected to the oppositely facing member 60, the first adjacent member 3 has: the first connection portions 306 each of which is provided only for being connected to the oppositely facing member 60; and the second connection portions 307 which are connected to the oppositely facing members 60 along with the connection of the air supply duct to the first adjacent member 3. However, the present invention is not limited to such a configuration. For example, the first adjacent member 3 may have only the first connection portions 306 each of which is provided only for being connected to the oppositely facing member 60. Alternatively, the first adjacent member 3 may include only the second connection portions 307 which are connected to the oppositely facing members 60 along with the connection of the air supply duct to the first adjacent member 3.

In the above-mentioned embodiment, the holder 6 includes the pair of oppositely facing members 60 and, along with such a configuration, the connection portions (the first connection portion 306 and the second connection portions 307) are formed on each of both end portions of the first body portion 30 of the first adjacent member 3. However, for example, when the holder 6 includes a single oppositely facing member 60, it is sufficient that the connection portions 306 (307) be formed on either one of the end portions (end portions which oppositely face the oppositely facing members 60) of the first body portion 30 of the first adjacent member 3.

In the above-mentioned embodiment, the first adjacent member 3 includes the projecting portions 32 provided for forming the flow channels. However, the present invention is not limited to such a configuration. It is sufficient that the projecting portions 32 be formed according to necessity of the flow channels.

In the above-mentioned embodiment, each fixing portion 11 includes: the threaded hole 306a as the female threaded portion formed on the first adjacent member 3; and the male threaded portion 111 of the male threaded member 110 as the shaft-like member. However, the present invention is not limited to such a configuration. For example, each fixing portion 11 may include: a male threaded portion which is formed on the first adjacent member 3 and is made to pass through the oppositely facing member 60; and a female threaded portion (a nut, for example) which is combined with the male threaded portion. That is, it is sufficient that each fixing portion 11 include: the male threaded portion which is made to pass through the oppositely facing member 60; and the female threaded portion which is combined with the male threaded portion, and the male threaded portion or the female threaded portion be formed on the first adjacent member 3.

In the above-mentioned embodiment, each of the connection portions 306, 307 is formed of a female threaded member made of metal and, along with such a configuration, the first adjacent member 3 is formed by insert molding. However, the present invention is not limited to such a configuration. For example, the connection portions 306, 307 may be formed by resin molding in the same manner as other members. However, each of the connection portions 306, 307 is connected to the oppositely facing member 60 and hence, it is needless to say that strength (rigidity) of the connection portions 306, 307 is required to be held with certainty.

In the above-mentioned embodiment, the body portion 30, 40, 50 of the adjacent member 3, 4, 5 is formed into a quadrangular shape corresponding to the outer surface of the case 20 of the energy storage device 2 which is directed in the X axis direction. However, the present invention is not limited to such a configuration. Provided that a creepage distance between the energy storage devices 2 disposed adjacently to each other can be held with certainty, a shape of the body portion 30, 40, 50 of the adjacent member 3, 4, 5 may be changed into various shapes.

In the above-mentioned embodiment, the energy storage devices 2 are disposed in each of two divided regions in the X axis direction using the first body portion 30 of the first adjacent member 3 as a boundary, and the first adjacent member 3 performs the positioning of the energy storage devices 2 disposed in each of two regions. However, the present invention is not limited to such a configuration. For example, the energy storage devices 2 may be disposed in either one of two divided regions in the X axis direction using the first body portion 30 of the first adjacent member 3 as the boundary, and the first adjacent member 3 may perform the positioning of the energy storage devices 2 disposed in one region. To be more specific, it may be configured such that two first adjacent members 3 are disposed in a spaced-apart manner in the X axis direction, and one first adjacent member 3 performs the positioning of the energy storage devices 2 disposed in the region on one side in the X axis direction while the other first adjacent member 3 performs the positioning of the energy storage devices 2 disposed in the region on the other side in the X axis direction. It is needless to say that, also in this case, each first adjacent member 3 is engaged with (connected to) the opposedly facing members 60.

In the above-mentioned embodiment, the second body portion 40 of each second adjacent member 4 is formed into a rectangular corrugated shape in cross section. However, the present invention is not limited to such a configuration. For example, the second body portion 40 may be formed into a flat plate shape. In such a case, when the flow channels are formed as in the case of the above-mentioned embodiment, it is sufficient for the second adjacent member 4 to have projecting portions (projecting ridges) which project from the second body portion 40 having a flat plate shape.

In the above-mentioned embodiment, the adjacent member 3, 4, 5 includes the restricting portions 31, 41, 51. However, the present invention is not limited to such a configuration. It is sufficient to provide the restricting portions 31, 41, 51 to the adjacent member 3, 4, 5 according to necessity. Further, in the above-mentioned embodiment, the restricting members 310, 410, 510 of each pair of restricting portions 31, 41, 51 are formed along four corners (four corner portions) of the body portion 30, 40, 50. However, the present invention is not limited to such a configuration. The restricting portions 31, 41, 51 may be disposed at positions where the restricting portions 31, 41, 51 can constrain the cases 20 of the energy storage devices 2.

What is claimed is:

1. An energy storage apparatus comprising:
an energy storage device;
an opposedly facing member which opposedly aces the energy storage device in a first direction;
an adjacent member which opposedly faces the opposedly facing member in the first direction and is disposed adjacently to the energy storage device in a second direction orthogonal to the first direction; and
an engaging portion where the adjacent member and the opposedly facing member are engaged with each other in a movable manner;
wherein the engaging portion includes: a hole which is formed in one of either the opposedly facing member or the adjacent member, the hole having a center axis thereof extending in the first direction; and a shaft portion which is formed on the other of either the opposedly facing member or the adjacent member, the shaft portion being inserted into, the hole in a state where a gap is formed between an outer peripheral surface of the shaft portion and an inner peripheral surface which defines the hole.

2. The energy storage apparatus according to claim 1, wherein the energy storage device has external terminals on an end portion thereof in a third direction orthogonal to the first direction and the second direction, and the shaft portion is inserted into the hole in a state where a gap is formed in the third direction between the outer peripheral surface of the shaft portion and the inner peripheral surface which defines the hole.

3. The energy storage apparatus according to claim 1, wherein the energy storage apparatus includes a fixing portion which fixes the adjacent member to the opposedly facing member, and the fixing portion makes the opposedly facing member and the adjacent member non-movable to each other.

4. The energy storage apparatus according to claim 3, wherein the fixing portion includes a shaft-like member which extends in the first direction and extends over the opposedly facing member and the adjacent member, and the shaft-like member is insertable or retractable with respect to at least the adjacent member.

5. An energy storage apparatus comprising:
an energy storage device;
an opposedly facing member which opposedly faces the energy storage device in a first direction;
an adjacent member which opposedly faces the opposedly facing member in the first direction and is disposed adjacently to the energy storage device in a second direction orthogonal to the first direction;
an engaging portion where the adjacent member and the opposedly facing member are engaged with each other in a movable manner; and
a fixing portion which fixes the adjacent member to the opposedly facing member, wherein
the engaging portion includes:
a hole which is formed in one of either the opposedly facing member or the adjacent member, the hole having a center axis thereof extending in the first direction; and
a shaft portion which is formed on the other of either the opposedly facing member or the adjacent member, the shaft portion being inserted into the hole in a state where a gap is formed between an outer peripheral surface of the shaft portion and an inner peripheral surface which defines the hole,
the fixing portion includes: a male threaded portion which is made to pass through the opposedly facing member; and a female threaded portion which is combined with the male threaded portion, and
the adjacent member includes either one of the male threaded portion or the female threaded portion.

6. A method of manufacturing an energy storage apparatus according to claim 1, the method comprising:
providing an energy storage device which is disposed adjacently to an adjacent member in a second direction orthogonal to a first direction out of an opposedly facing member and the adjacent member which opposedly face each other in the first direction and are engaged with each other in a movable manner; and
changing a relative position between the energy storage device and the opposedly facing member.

7. The method of manufacturing an energy storage apparatus according to claim 6, wherein the method further includes making the opposedly facing member and the adjacent member non-movable to each other after the relative position between the energy storage device and the opposedly facing member is changed.

8. The method of manufacturing an energy storage apparatus according to claim 6, wherein the energy storage device has external terminals on an end portion thereof in a third direction orthogonal to the first direction and the second direction, and a change in the relative position between the energy storage device and the opposedly facing member includes the change in relative position between the energy storage device and the opposedly facing member in a third direction.

* * * * *